United States Patent [19]

Ohashi et al.

[11] Patent Number: 5,276,567
[45] Date of Patent: Jan. 4, 1994

[54] TAPE PLAYER

[75] Inventors: Tamaki Ohashi, Tokyo; Hideki Oshima, Saitama, both of Japan

[73] Assignee: Tuner Company Limited, Tokyo, Japan

[21] Appl. No.: 31,378

[22] Filed: Mar. 12, 1993

Related U.S. Application Data

[63] Continuation of Ser. No. 600,402, Oct. 19, 1990, abandoned.

[30] Foreign Application Priority Data

Oct. 25, 1989 [JP] Japan .................. 1-276137

[51] Int. Cl.$^5$ ............. G11B 15/18; G11B 21/02; G11B 5/54
[52] U.S. Cl. .................. 360/69; 360/105; 360/96.02; 360/75
[58] Field of Search ............ 360/105, 75, 69, 137, 360/96.2

[56] References Cited

U.S. PATENT DOCUMENTS 4,722,013  1/1988  Hayashi ............... 360/105

Primary Examiner—Aristotelis Psitos
Assistant Examiner—Varsha V. Sheladia
Attorney, Agent, or Firm—James A. Wong

[57] ABSTRACT

A tape player includes a changeover mechanism for shifting the position of a tape travel direction changeover member in response to the reciprocating movement of a rewind pushbutton actuator, a head channel selector switch connected to the changeover mechanism via a resilient connecting mechanism and shiftable in response to the shifting operation of the changeover mechanism, silence detecting for detecting a blank interval between recordings on a magnetic tape and producing a silence interval detection signal upon detection of the blank interval, a latch mechanism for releasably holding the rewind pushbutton actuator in its advanced position, the latch mechanism being responsive to the silence interval detection signal for releasing the rewind pushbutton actuator, and blocking member for blocking the shifting operation of the head channel selector switch during the forward movement of the rewind pushbutton actuator.

11 Claims, 17 Drawing Sheets

TAPE PLAYER

This is a continuation of co-pending application Ser. No. 600,402 filed on Oct. 19, 1990, now abandoned.

BACKGROUND OF THE INVENTION

1. Field of the Invention

The present invention relates to a tape player having a silence detecting device for detecting a blank interval in the sound programming on the magnetic tape.

2. Description of the Prior Art

One known tape player equipped with a silence detecting device is disclosed in Japanese Patent Laid-open Publication No. 60-7637 issued to the present assignee. When a blank interval in the sound programming is to be detected in the fast rewind direction, a fast rewind push-button actuator is depressed to change the direction of travel of the magnetic tape and move a head plate backward until the latter is locked in its retracted position. The retracting movement of the head plate precludes actuation of a head channel selection switch. When a blank interval in the sound programming on the magnetic tape is detected, the silence detecting device issues a detection signal which in turn releases the head plate from the retracted position, thereby allowing the head plate to move forwardly. The detecting signal also releases the head channel shaft switch and again changes the direction of travel of the magnetic tape to resume the previous play mode.

The changeover operation of the tape travel direction, the rearward movement of the head plate, and the locking operation of the head channel shift switch take place substantially at one time in response to manual movement of the fast rewind pushbutton actuator. Consequently, when these mechanical operations were timed inaccurately, the desired operation of the tape player is difficult to obtain. More specifically, if the rearward movement of the head plate takes subsequently to the switching of the tape travel direction, the head channel shift switch is actuated without restriction. On the other hand, if the rearward movement of the head plate occurs prior to the switching of the tape travel direction, the tape is fed forwardly at fast speed before the tape travel direction is shifted, thereby causing a skidding of the tape.

SUMMARY OF THE INVENTION

With the foregoing drawbacks of the prior art in view, it is therefore an object of the present invention to provide a tape player having a silence detecting device and incorporating structural features which enable an accurate operation of the tape player without causing timing error between operations of the related movable parts.

A tape player of the present invention comprises a reciprocably movable fast rewind pushbutton actuator, changeover means for shifting the position of a tape travel direction changeover member in response to the reciprocating movement of the fast rewind pushbutton actuator, a head channel selector switch connected to the changeover means via resilient connecting means and shiftable from one state to another in response to the shifting operation of the changeover means, silence detecting means for detecting a blank interval between recordings on a magnetic tape and producing a silence interval detection signal upon detection of the blank interval, a latch mechanism for releasably holding the fast rewind pushbutton actuator in its advanced position, the latch mechanism being responsive to the silence interval detection signal for releasing the fast rewind pushbutton actuator, and blocking means for blocking the shifting operation of the head channel selector switch during the forward movement of the fast rewind pushbutton actuator.

According to a preferred embodiment of the invention, the resilient connecting means includes an actuating member movable to shift the head channel selector switch and operatively connected with the blocking means so that the movement of the actuating member in a direction to shift the head channel selector switch being blocked by the blocking means member, a pivotable member rotatably movable about its central portion and having one end connected to one of the actuating member and the tape travel direction changeover member, and a resilient member resiliently connecting the opposite end of the pivotable member and the other of the actuating member and the tape travel direction changeover member while allowing relative movement therebetween.

According to another preferred embodiment of the invention, the resilient connecting means includes an actuating member movable to shift the head channel selector switch and operatively connected with the blocking means so that the movement of the actuating member in a direction to shift the head channel selector switch being blocked by the blocking means member, an elongate arm immovably connected at its one end to one of the actuating member and the tape travel direction changeover member, and a resilient member resiliently connecting the opposite end of the arm and the other of the actuating member and the tape travel direction changeover member while allowing relative movement therebetween.

The player may include a reciprocably movable fast forward pushbutton actuator adapted to be held in its advanced position by the latch mechanism, and an abutment member acting between the fast forward pushbutton actuator and the blocking means to block forward movement of the fast forward pushbutton actuator when the fast forward pushbutton actuator and the fast rewind pushbutton actuator are simultaneously forced forwardly.

With this construction, when a blank interval between the recordings on the magnetic tape is to be detected in the reverse direction, the fast rewind pushbutton actuator is depressed or moved forwardly. In response to the forward movement of the fast rewind pushbutton actuator, the tape travel direction changeover member is acted upon to change the direction of travel of the magnetic tape. At the same time, the head plate is moved rearward so that the magnetic tape is fed in the reverse direction at fast rewind speed. The fast rewind pushbutton actuator is held in its advanced position by the latch mechanism.

The blocking means responds to the forward movement of the fast rewind pushbutton actuator to block movement of the actuating member tending to shift the head channel selector switch from one state to another. The changeover operation of the tape travel direction changeover means causes the pivotable member to turn against the resilience of the resilient member acting between the actuating member and the pivotable member.

During forward movement of the fast rewind pushbutton actuator, the operation of the tape travel direction changeover means is permitted, while the operation of the head channel selector switch is prevented by the action of the blocking means.

When a blank interval between the recordings is detected, the silence detecting means produces a silence interval detection signal which in turn causes the latch mechanism to release the fast rewind pushbutton actuator from its advanced position. The fast rewind pushbutton actuator moves rearward to its initial position during which time the tape travel direction changeover member is acted again to resume the forward travel of the magnetic tape.

As described above, the resilient connecting means may be composed of an actuating member movable to shift the head channel selector switch and adapted to be blocked by said blocking means from moving in a direction to shift the head channel selector switch, a lever connected at its one end to one of the actuating member and the tape travel direction changeover member, and a resilient member connected between the opposite end of the lever and the other of the actuating member and the tape travel direction changeover member while allowing the relative movement therebetween. In this instance, the resilient member permits the changeover operation of the tape travel direction changeover member as it is resiliently flexed by the lever or the actuating member in response to the movement of the tape travel direction changeover member.

The fast forward pushbutton actuator is held in its advanced position by the latch mechanism. However, when the fast forward pushbutton actuator is depressed simultaneously with the fast rewind pushbutton actuator, forward movement of the fast forward pushbutton actuator is prevented by an abutment member acting between the block means and the fast forward pushbutton actuator. As a result, concurrent latching of the fast forward pushbutton actuator and the fast rewind pushbutton actuator by the latch mechanism does not take place.

The above and other objects, features and advantages of the present invention will become more apparent from the following description when making reference to the detailed description and the accompanying sheets of drawings in which preferred structural embodiments incorporating the principles of the present invention are shown by way of illustrative example.

DETAILED DESCRIPTION OF THE PREFERRED EMBODIMENTS

Figure 1:
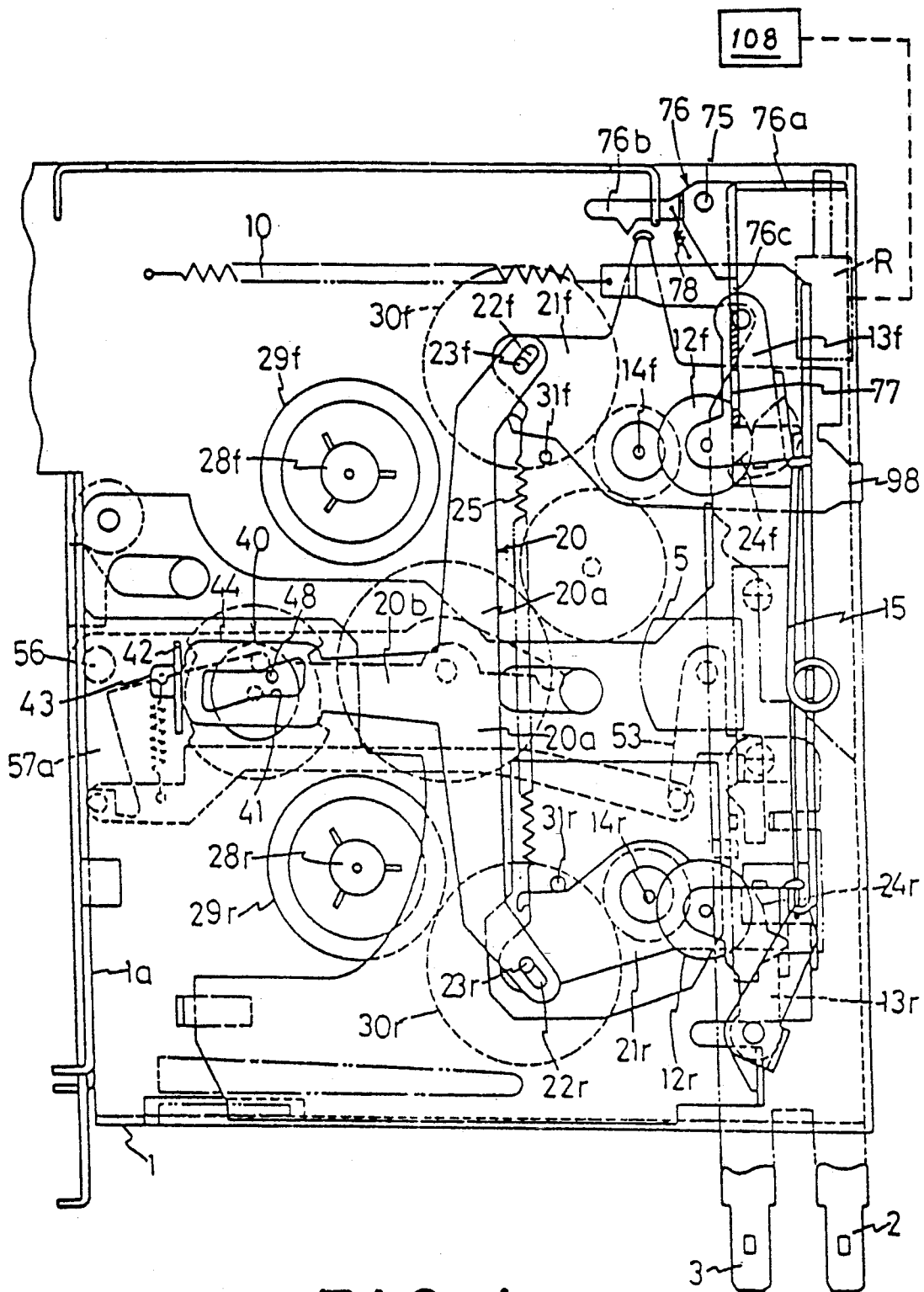
FIG. 1 is a plan view of a tape player according to the present invention, the view showing the relation between a head plate and a tape travel direction changeover mechanism in the play mode in the reverse direction.

The present invention will be described hereinbelow in greater detail with reference to certain preferred embodiments shown in the accompanying drawings, wherein like reference characters designate like or corresponding parts throughout the several views.

Figure 3:
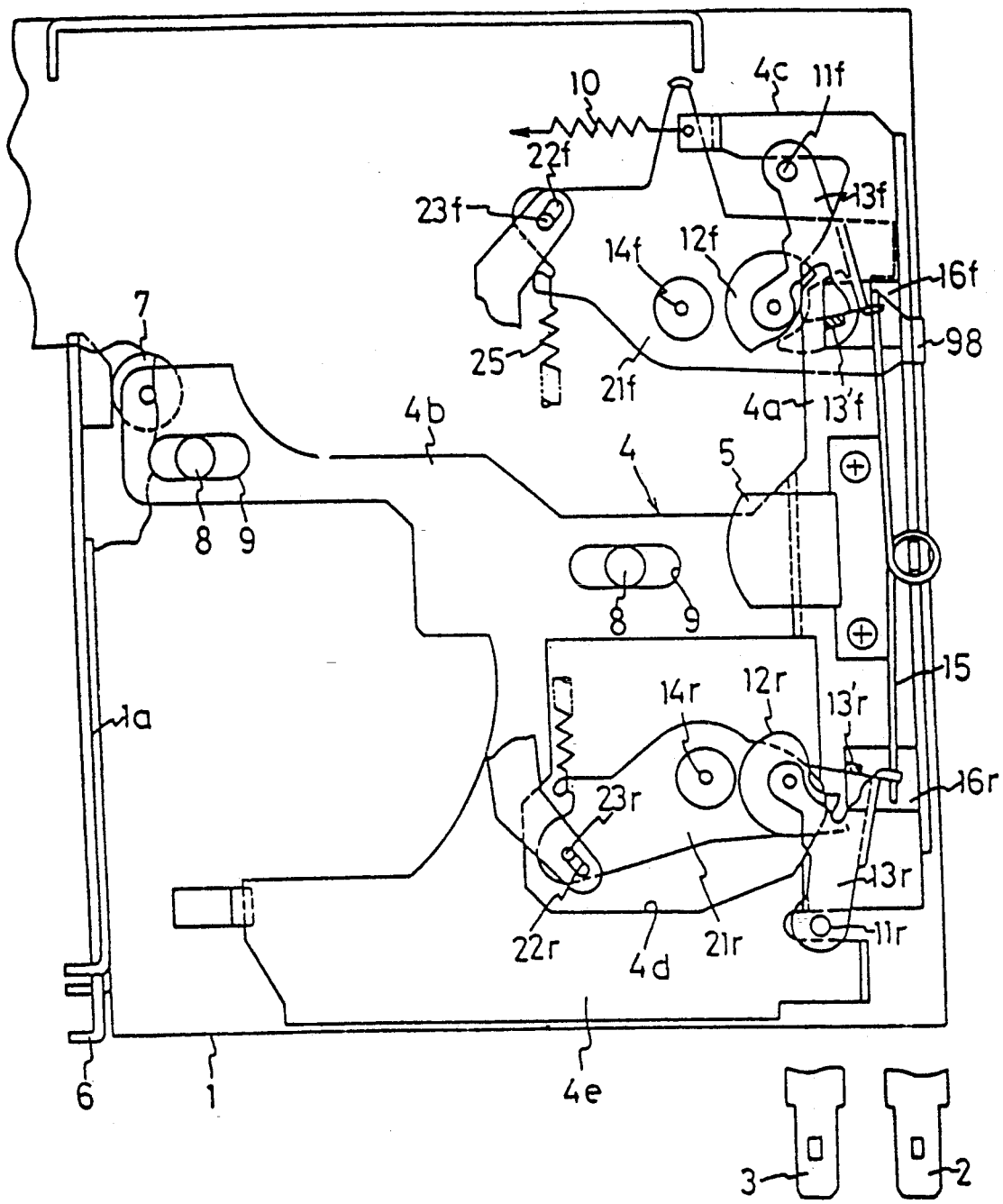
FIG. 3 is a plan view showing the relation between the head plate and a bracket with pinch rollers in the inoperative or stop mode.
Figure 4:
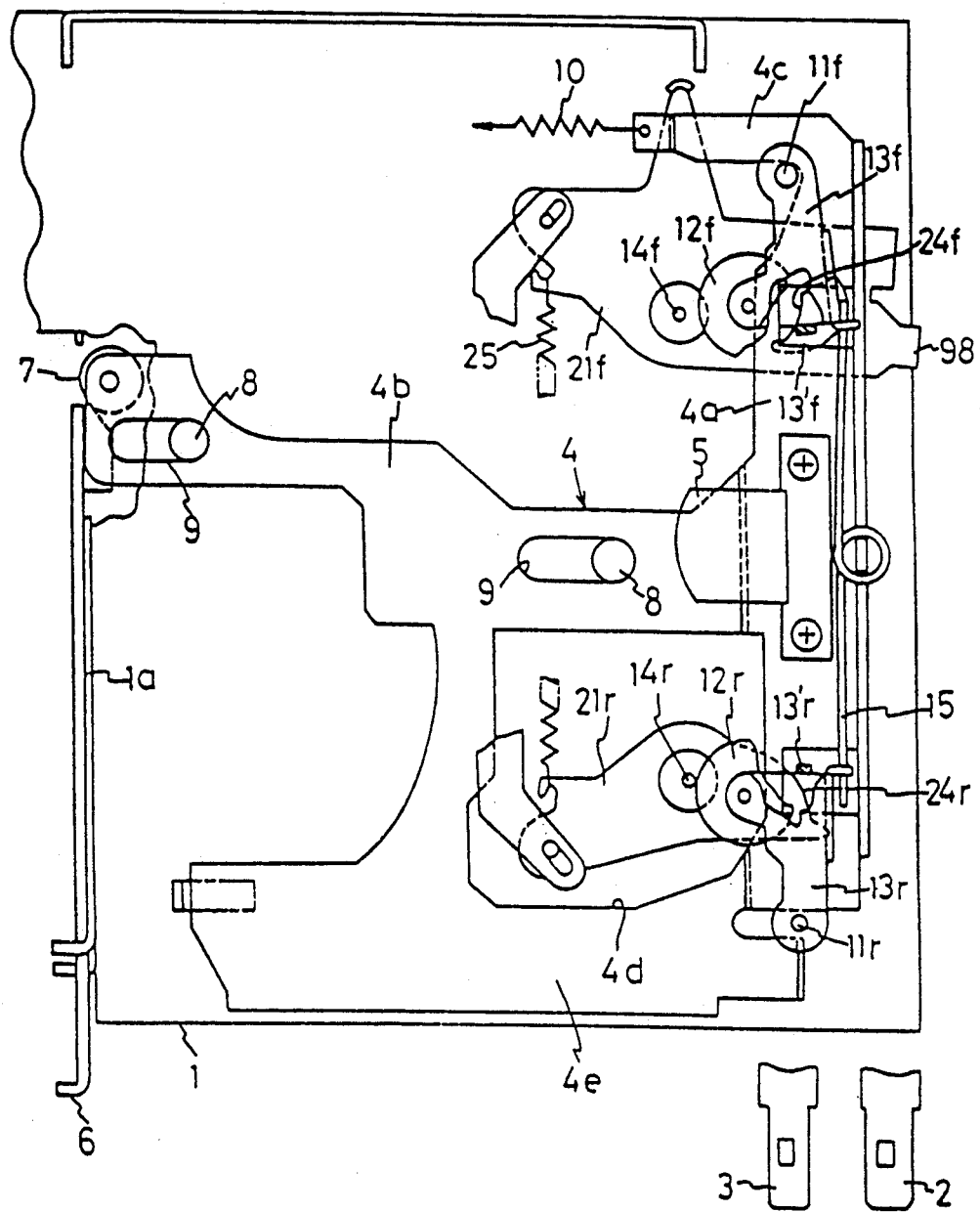
FIG. 4 is a view similar to FIG. 3, but showing the relation between the head plate and the bracket in the play mode.

A tape player embodying the present invention includes a chassis 1 carrying along its one side (right side in FIG. 1) a fast forward pushbutton actuator 2 and a fast rewind pushbutton actuator 3. The pushbutton actuators 2, 3 are reciprocably movable and each of them is normally urged rearwardly toward its retracted inactive position by means of a return spring (not shown). As shown in FIGS. 3 and 4, a head plate 4 is disposed flatwise below the fast forward pushbutton actuator 2 and the fast rewind pushbutton actuator 3. The head plate 4 includes an elongate base 4a extending substantially parallel to the pushbutton actuators 2, 3 and carrying on its central portion a magnetic head 5, a leg 4b extending transversely from the central portion of the base 4a toward the left side wall 1a of the chassis 1 on which an ejector lever 6 is slidably mounted, the leg 4b supporting on its distal end a roller 7, a support arm 4c extending from the forward end of the base 4a in parallel spaced relation to the leg 4b, and an enlarged wing 4e extending from the base 4a and the leg 4b in such a manner as to close a space between an upper part of the leg 4b and an rear end portion of the base 4a, the wing 4d having an aperture 4d pertly defined by the upper part of the leg 4b and the rear end portion of the base 4a. The head plate 4 is mounted on the chassis 1 by a pair of pins 8 projecting from the chassis 1 and loosely received in a pair of oblong holes 9, respectively, formed in the leg 4b of the head plate 4. The oblong holes 9 extends transversely of the pushbutton actuators 2, 3 so that the head plate 4 is reciprocably movable in a direction transverse to the direction of movement of the pushbutton actuators 2, 3. The support arm 4c is connected to one end of a tension spring 10 so that the head plate 4 is normally urged by the tension spring 10 in a direction toward the left side wall 1a, i.e., toward a play position.

As shown in FIGS. 3 and 4, a pair of brackets 13f, 13r is disposed adjacent the forward and rearward ends, respectively, of the base 4a of the head plate 4. Each of the brackets 13f, 13r is pivoted at its one end to the chassis 1 by a pivot pin 11f, 11r and supports on the opposite end a pinch roller 12f, 12r. An elongate wire spring 15 is supported at its looped central portion on the central portion of the base 4a of the head plate 4. The wire spring 15 extends longitudinally of the base 4a and has opposite ends acting on the brackets 13f, 13r to resiliently urge them toward a pair of capstan shafts 14f, 14r. The brackets 13f, 13r have a pair of locking lugs 13'f, 13'r lockingly engageable with edges of a pair of recesses 16f, 16r (FIG. 3) defined respectively in the forward and rearward end portions of the base 4a when the head plate 4 is displaced rightward.

A tape travel direction changeover member 20 comprises, as shown in FIG. 1, a substantially T-shaped plate including an elongate head 20a extending parallel to the pushbutton actuators 2, 3, and a leg 20b extending perpendicularly from a central portion of the head 20a toward the left side wall 1a of the chassis 1, the head 20a having opposite bent end portions extending obliquely away from the leg 20b. The bent end portions of the head 20a have a pair of oblong holes 22f, 22r loosely receiving respectively therein a pair of shafts 23f, 23r secured to one end of a pair of pivotable plates 21f, 21r. The tape travel direction changeover member 20 is linked with the pivotable plates 21f, 21r. The pivotable plates 21f, 21r are pivoted at their central portions to the capstan shafts 14f, 14r. Each of the pivotable plates 21f, 21r has a cam 24f, 24r engageable with a corresponding one of the locking lugs 13'f, 13'r for controlling angular movement of the latter. A tension coil spring 25 extents between the pivotable plates 21f, 21r and urges them in a direction to move the shafts 23f, 23r toward each other.

When the head plate 4 is disposed in its retracted non-play position, the locking lugs 13'f, 13'r on the respective brackets 13f, 13r are held in abutment with the edges of the respective recesses 16f, 16r as shown in FIG. 3, so that the pinch rollers 12f, 12r are separated from the corresponding capstan shafts 14f, 14r. While keeping this condition, a cassette is loaded on the tape player in a known manner whereupon the head plate 4 moves leftward toward its advanced play position, causing the brackets 13f, 13r to move in the same direction. In this instance, the bracket 13f on the front side turns clockwise in FIGS. 1 and 4 about the pivot pin 11f and engages the cam 24f of the pivotable plate 21f so that the pinch roller 12f is separated from the corresponding capstan shaft 14f. On the other hand, the bracket 13r on the rear side turns counterclockwise and does not engage the cam 24r so that the pinch roller 12r abuts against the corresponding capstan shaft 14r.

Figure 2:
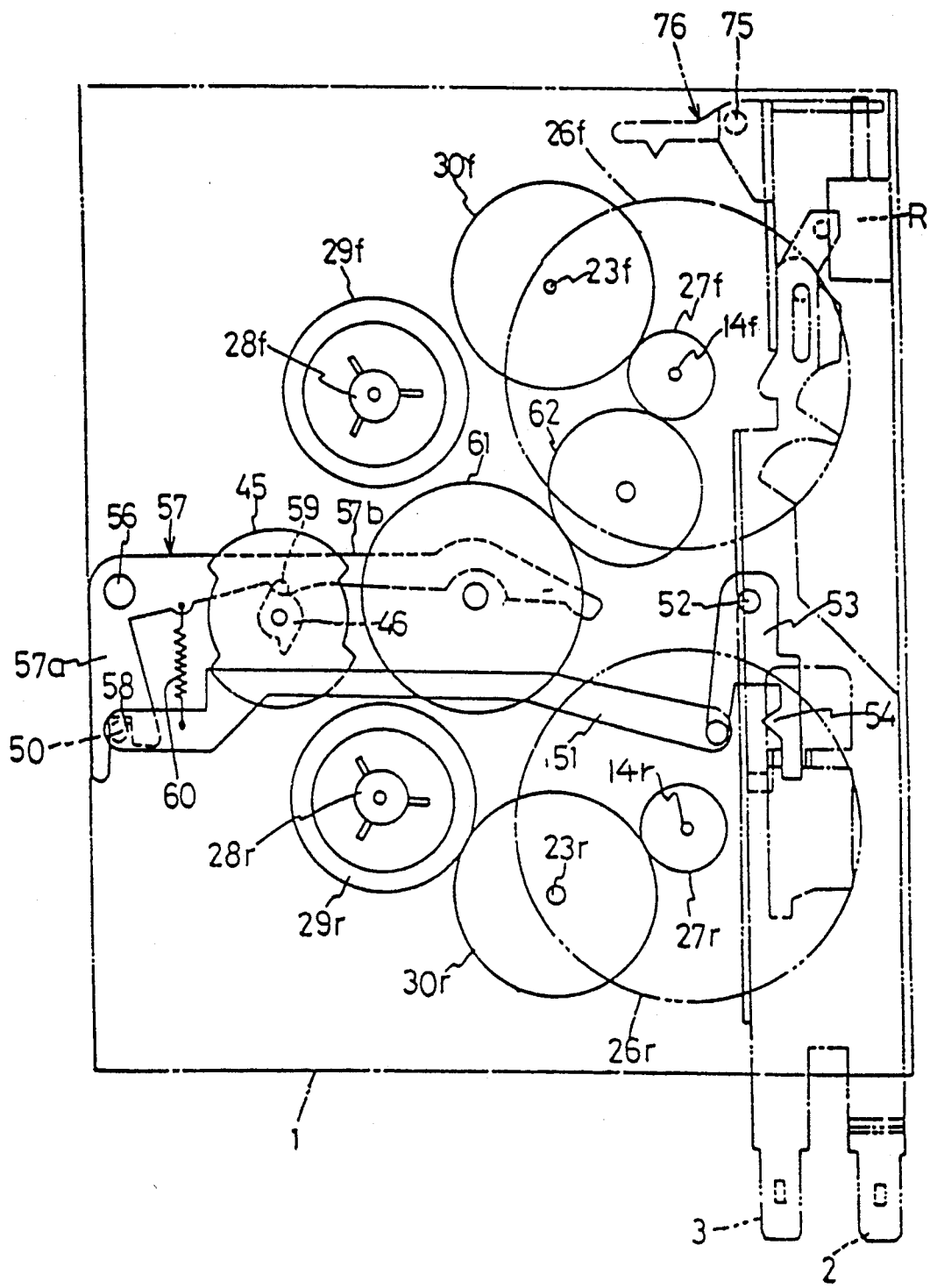
FIG. 2 is a plan view showing a reel driving mechanism of the tape player.
Figure 5:
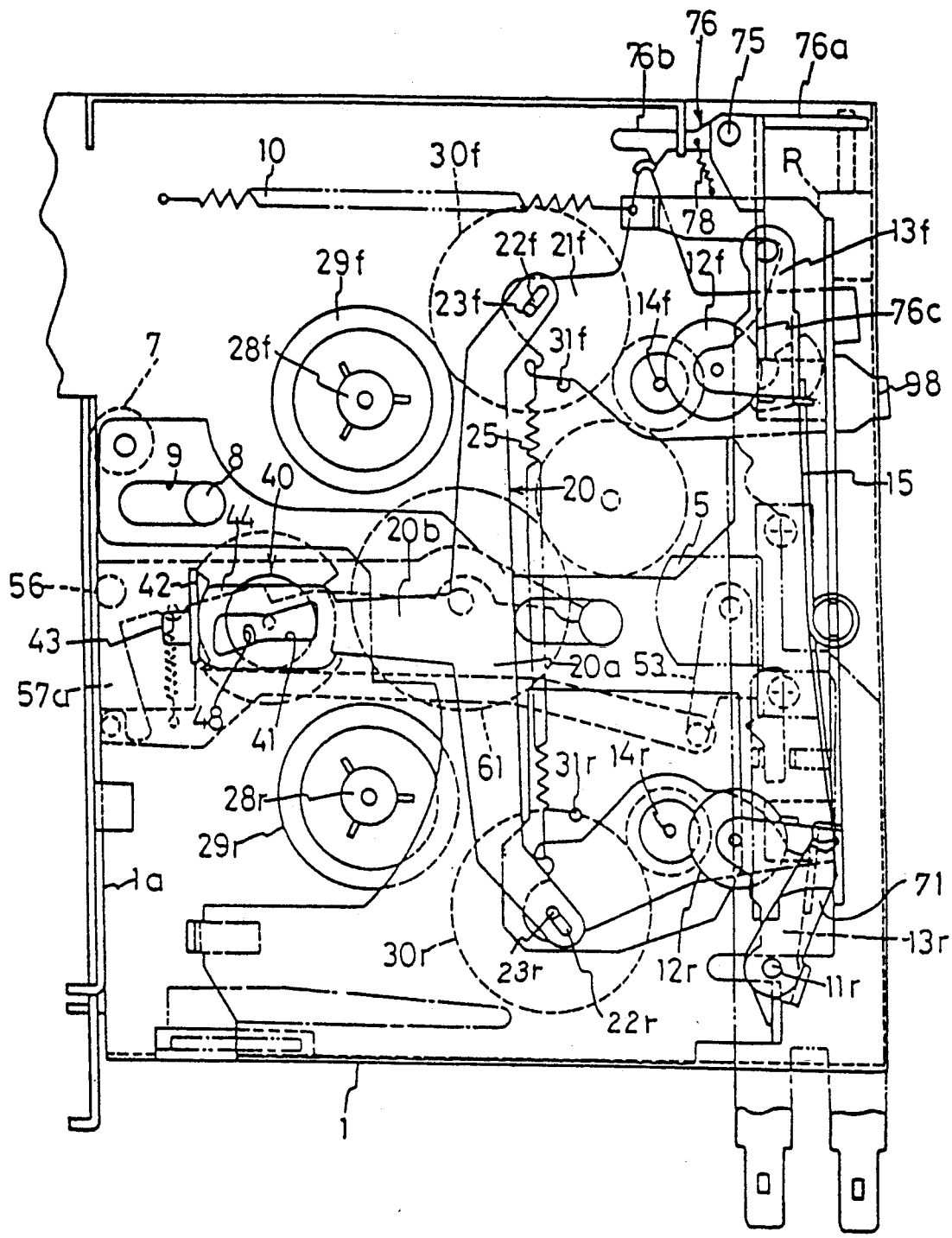
FIG. 5 is a plan view similar to FIG. 1, but showing the tape player with parts in the play mode in the forward direction.

As shown in FIG. 2, a pair of motor-driven flywheels 26f, 26r and a pair of drive gears 27f, 27r are mounted on the capstan shafts 14f, 14r. A pair of reel shafts 28f, 28r supports respectively thereon a pair of reel gears 29f, 29r. The reel gear 29f and the drive gear 27f and the reel gear 29r and the drive gear 27r are trained by a pair of transfer gears 30f, 30r, respectively, rotatably mounted on the shafts 23f, 23r. The transfer gear 30r is held in mesh with the corresponding drive gear 27r and the reel gear 29r and hence the magnetic tape is wound around the reel shaft 28r. FIG. 5 shows another condition in which the magnetic tape is wound around the reel shaft 28f as opposed to the condition shown in FIGS. 1 and 4. This condition is realized when the tape travel direction changeover member 20 is moved rearwardly (downward) from the position shown in FIG. 1 under the action of a tape travel direction changeover mechanism 40 described later.

When the tape travel direction changeover member 20 is displaced rearward by the tape travel direction changeover mechanism 40, the edge of the oblong hole 22r in the tape travel direction changeover member 20 urges the shaft 23r on the pivotable plate 21r in a direction to turn the pivotable plate 21r counterclockwise against the force of the spring 25. This angular movement of the pivotable plate 21r causes the cam 24r to engage the locking lug 13'r on the bracket 13r and then urge the latter in a direction to turn the bracket 13r clockwise whereby the pinch roller 12r is separated from the corresponding capstan shaft 14r. Since the shaft 23r is displaced as described above, the transfer gear 30r disengages from the reel gear 29r.

On the other hand, the pivotable plate 21f on the front side is urged counterclockwise by the spring 25 so that the cam 24f is disengaged from the locking lug 13'f on the bracket 13f. Thus, the pinch roller 12f on the bracket 13f is urged against the corresponding capstan shaft 14f by the force of the spring 25. At the same time, the shaft 23f is displaced in a direction to bring the transfer gear 30f into meshing engagement with the corresponding reel gear 29f. Consequently, the magnetic tape is wound around the reel shaft 28f on the front side.

As appears clear from the foregoing description, the direction of travel of the magnetic tape changes in response to reciprocating movement of the tape travel direction changeover member 20.

The depth of meshing engagement between the transfer gears 30f, 30r and the reel gears 29f, 29r is determined by limiting angular movement of the pivotable plates 21f, 21r by means of a pair of stopper pins 31f, 31r.

A further description will be given to the tape travel direction changeover mechanism 40 shown in FIGS. 1, 2 and 6. The tape travel direction changeover mechanism 40 generally comprises an actuating portion 44, a mutilated gear 45, a locking pawl 46, an abutment finger 47, an actuating pin 48, a torsion spring 49, an elongate first lever 51, a rocking member 53, a second lever 57, a tension spring 60 and an operating gear 61.

As shown in FIG. 1, the actuating portion 44 is a planar foot-like, enlarged integral extension of the leg 20b of the tape travel direction changeover member 20. The foot-like actuating portion 44 has a central cam hole 41 of a substantially rhomboidal shape narrowed at its longitudinal central portion, and a guide tongue 43 projecting toward the left side wall 1a of the chassis 1. The guide tongue 43 is slidably received in a guide hole formed in a support lug 42 upstanding from the chassis 1 so as to guide the forward and rearward movements of the tape travel direction changeover member 20 including the actuating portion 44. The mutilated gear 45, as shown in FIG. 6, has diametrically opposite peripheral portions 45a, 45b from teeth, that is, teeth are removed from these portions 45a, 45b. The locking pawl 46 is fixedly mounted on an integral shaft of the mutilated gear 45 and has a pair of diametrically opposite locking prongs. The abutment finger 47 extends linearly and is fixedly mounted on the shaft of the mutilated gear 45. The actuating pin 48, as shown in FIG. 1, is received in the cam hole 41 and mounted eccentrically on the mutilated gear 45. The torsion spring 49 (FIG. 6) has one end acting on a side of the abutment finger 47 for urging the mutilated gear 45 to turn in the clockwise direction. The elongate first lever 51 generally extents in the transverse direction of the chassis 1 and has an engagement pin 50 at its one end adjacent to the left side wall 1a (FIG. 1) of the chassis 1. The rocking member 53 is pivoted at its proximal end on a pivot shaft 52, the free end of the rocking member 53 being bifurcated. One leg 53a of the bifurcated end is articulated to the opposite end of the first lever 51, while the opposite leg 53b has a triangular projection 54 directed toward the leg 53a. The second lever 57 is bent into an L-shape and has a short arm 57a and a long arm 57b. The L-shaped lever 57 is rotatably mounted on a pivot shaft 56 at the junction between the short and long arms 57a, 57b. The short arm 57a extends longitudinally of the chassis 1 and has in its distal end a rearwardly open recess 58 in which the engagement pin 50 is received. The long arm 57b extends transversely of the chassis 1 and has on its central portion a locking pin 59 engageable with the locking prongs of the locking pawl 46. The tension spring 60 extends between the first lever 51 and the long arm 57b of the second lever 57 and urges them toward each other. The operating gear 61 meshes with the mutilated gear 45.

Figure 6A:
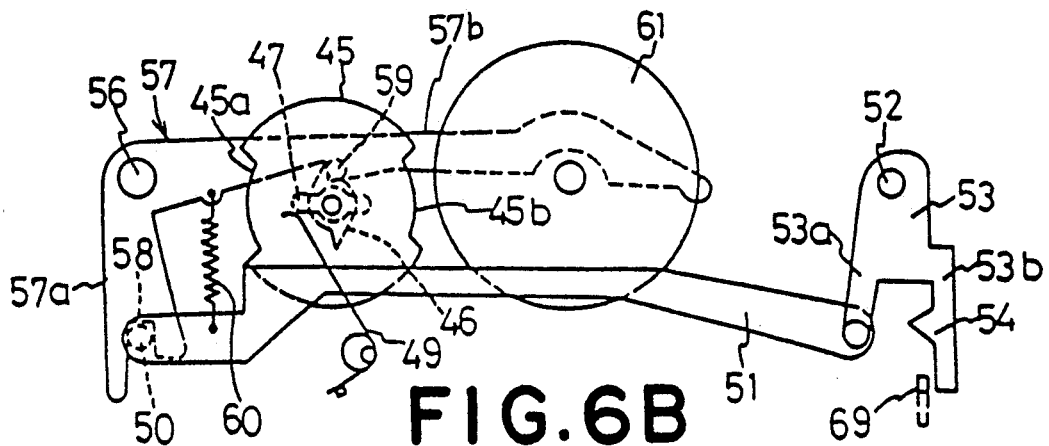
FIGS. 6A-6C are plan views illustrative of the operation of the tape travel direction changeover mechanism.
Figure 6B:
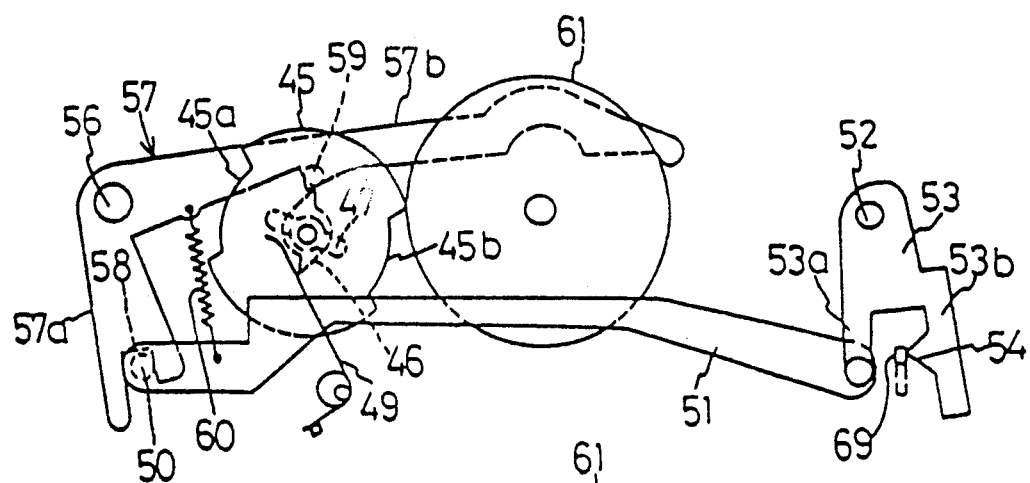

Assuming that the mutilated gear 45 is arrested after it completed a half revolution, and the fast rewind pushbutton actuator 3 is depressed forwardly against the force of the non-illustrated return spring with parts in a first changeover position shown in FIGS. 1 and 4 wherein the magnetic tape is being wound around the reel shaft 28r on the rear side, the rocking member 53 turns counterclockwise in FIG. 6A about the pivot shaft 52, as described later on. With this angular movement of the rocking member 53, the first lever 51 is pulled rightward as shown in FIG. 6B, causing the second lever 57 to turn counterclockwise about the pivot shaft 56 through the agency of the engagement between the engagement pin 50 and the recess 58. This angular movement of the second lever 57 disengages the locking pin 59 from one of the locking prongs of the locking pawl 46 whereupon the mutilated gear 45 is allowed to rotate. Thus, the mutilated gear 45 starts rotating under the resiliency of the spring 49 acting on the abutment finger 47 and then comes into meshing engagement with the operating gear 61. The mutilated gear 45 is thus driven to rotate because the drive gear 27f is rotating simultaneously with the flywheel 26f continuously driven by a drive motor (not shown), and because the operating gear 61 is being driven by this drive gear 27f via an intermediate gear 62. When the mutilated gear 45 turns through an angle of approximately 180 degrees, the tooth-free portion 45a of the mutilated gear 45 confronts the operating gear 61 whereupon the mutilated gear 45 is separated from the operating gear 61. The locking pin 59 is brought again into engagement with the opposite locking prong of the locking pawl 46 to thereby arrest rotating movement of the mutilated gear 45. Now, the tape travel direction changeover mechanism 40 assumes a second changeover position shown in FIG. 5. The first changeover position shown in FIG. 1 and the second changeover position shown in FIG. 5 come one after another each time when a half revolution of the mutilated gear 45 is completed.

In the first changeover position shown in FIG. 1, the actuating pin 48 engages one side edge of the cam hole 41 so that the tape travel direction changeover member 20 is displaced forwardly. In the second changeover position shown in FIG. 5, the actuating pin 48 engages the opposite side edge of the cam hole 41 so that the tape travel direction changeover member 20 is displaced rearwardly. The direction of travel of the magnetic tape is thus changed.

Figures 7, 8:
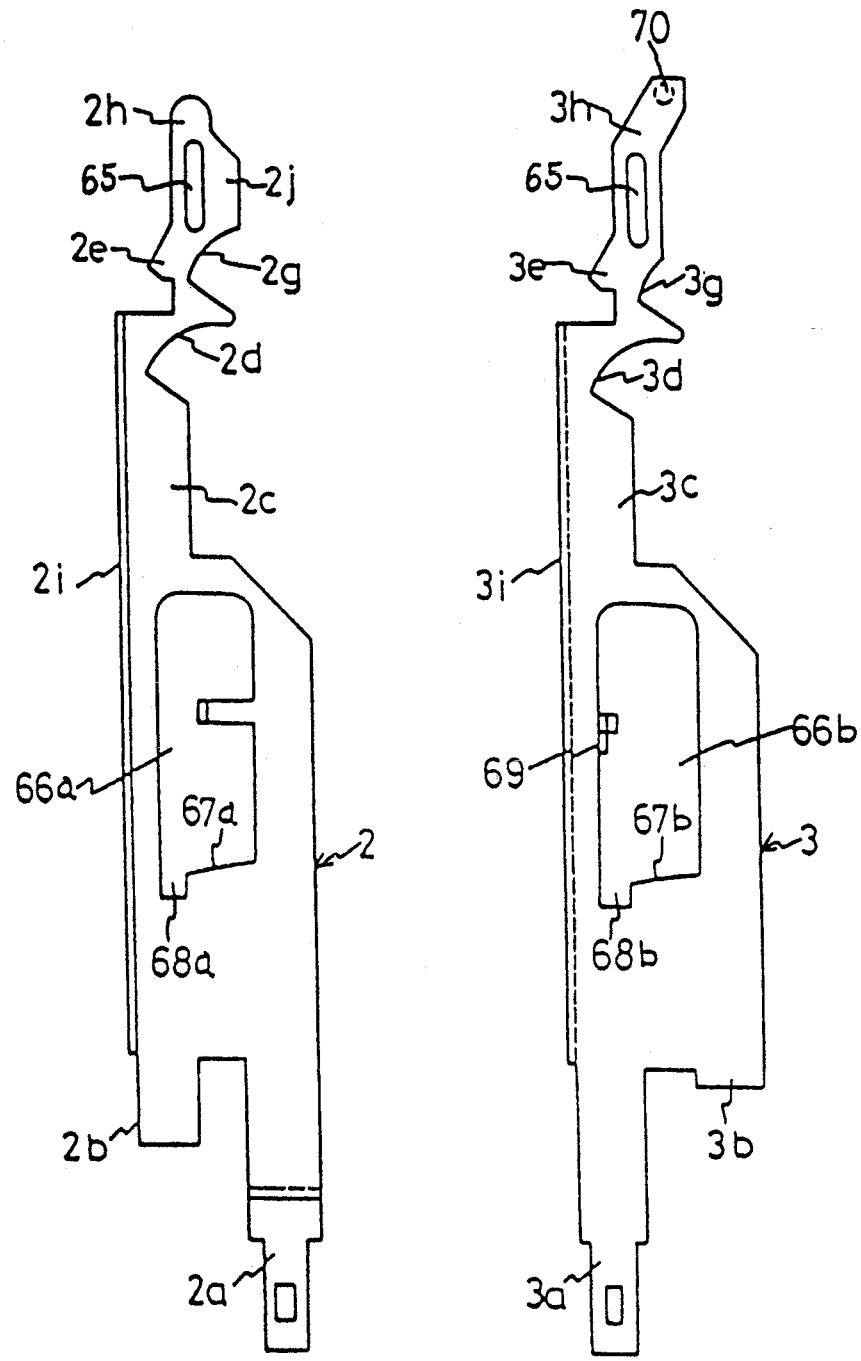
FIG. 7 is a plan view of a fast forward pushbutton actuator.
FIG. 8 is a plan view of a fast rewind pushbutton actuator.
Figure 9:
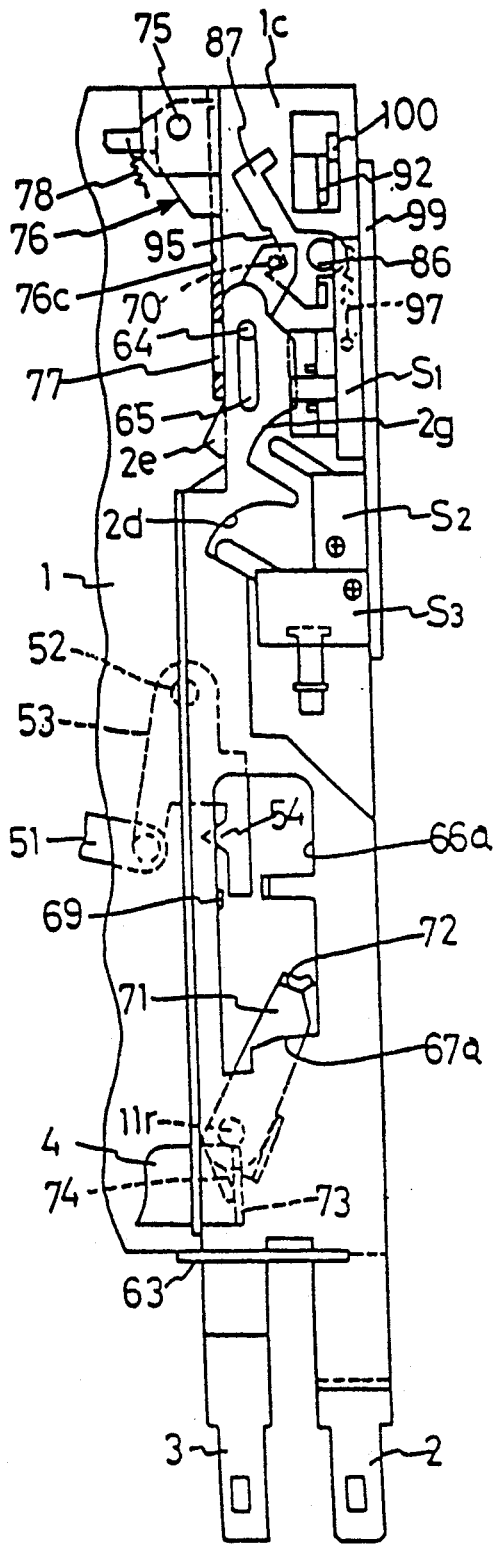
FIGS. 9 and 10 are plan views showing the operational relationship between the fast rewind pushbutton actuator, a latch mechanism and a head channel shift mechanism.

As shown in FIGS. 7 and 8, the fast forward pushbutton actuator 2 and the fast rewind pushbutton actuator 3 are formed of two analogous elongate plates. Each of the pushbutton actuators 2, 3 includes a narrow manipulating portion 2a, 3a extending along one side edge, a narrow overlapping strip 2b, 3b extending parallel to the manipulating portion 2a, 3a for being overlapped the manipulating portion 3a, 2a of the opposite actuator 3, 2 when the two pushbutton actuators 2, 3 are superposed one above another, a narrow actuating portion 2c, 3c located forwardly of the manipulating portion 2a, 2a and the overlapping strip 2b, 3b and having an arcuate first recess 2d, 3d formed in an outer side edge adjacent to the front end of the operating portion 2c, 3c, and a support strip 2h, 3h extending forwardly from the actuating portion 2c, 3c and having a locking projection 2e, 2e projecting from an inner side edge thereof and an arcuate second recess 2g, 3g formed in an outer side edge thereof. The fast forward pushbutton actuator 2 further has an elongate rib 2i extending along an inner longitudinal edge thereof and upstanding from a front surface thereof, while the fast rewind pushbutton actuator 3 has an elongate rig 3i extending along an inner longitudinal edge thereof and depending from the underside thereof. The pushbutton actuators 2, 3 are assembled in overlapping condition as shown in FIG. 9, and slidably mounted on an auxiliary base plate 1c disposed along the right side edge of the chassis 1. The pushbutton actuators 2, 3 are slidably movable back and forth as they are supported by an apertured support strip 63 upstanding from the rear edge of the auxiliary base plate 1c and by an engagement between a pin 64 projecting from the auxiliary base plate 1c and oblong holes 65, 65 formed in the support strips 2h, 3h of the respective pushbutton actuators 2, 3. Though not shown, the pushbutton actuators 2, 3 are urged rearwardly by means of the return springs.

Each of the pushbutton actuators 2, 3 further has an aperture or window 66a, 66b extending longitudinally in an intermediate portion of the pushbutton actuator 2, 3. The window 66a, 66b is pertly defined by an inclined rear edge 67a, 67b sloping down toward the inner side edge of the pushbutton actuator 2, 3 and blending in a recess 68a, 68b. The fast forward pushbutton actuator 2 includes an elongate protuberance 2j extending along the outer side edge of the support strip 2h. The fast rewind pushbutton actuator 3 includes an actuating lug 69 disposed at an intermediate portion of the inner longitudinal edge of the window 66b and engageable with the triangular projection 54 of the rocking member 53, and a pin 70 projecting downwardly from the front end of the support strip 3h.

As shown in FIGS. 1, 5, 9 and 10, a pivot lever 71 is disposed at a rear end portion of the chassis 1. The pivot lever 71 is pivotally movable to retract the head plate 4 when the fast feed pushbutton actuator 2 and the fast rewind pushbutton actuator 3 are separately depressed forwardly. The pivot lever 71 has at its front end a projection 72 coacting with the inclined edges 67a, 67b to pivot the pivot lever 71 and, at its rear end, a prong 74 engageable with a rib 73 upstanding from the outer edge of the head plate 4. The pivot lever 71 thus constructed is pivoted on the pivot pin 11r of the bracket 13r.

Figure 6C:
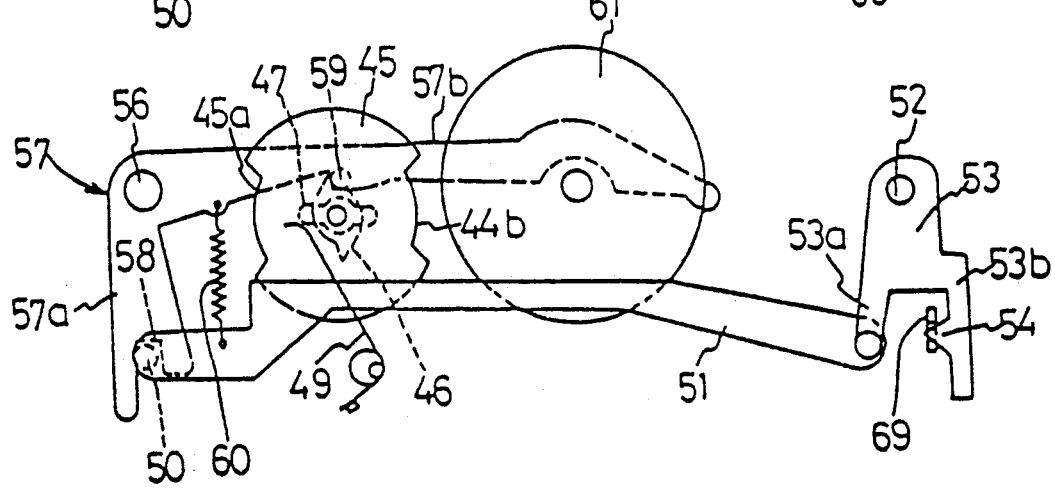

After the head plate 4 is advanced to the play position shown in FIG. 9, and with the fast forward and rewind pushbutton actuators 2, 3 disposed in the non-activated position, the fast rewind pushbutton actuator 3 is depressed against the force of the non-illustrated return spring, whereupon the actuating lug 69 of the fast rewind pushbutton actuator 3 engages the triangular projection 54 of the locking member 53 to turn the locking member 53 in the counterclockwise direction, as shown in FIG. 6C. With this angular movement of the locking member 53, the head channel shifting operation is performed as described above. At the same time, as shown in FIG. 10, the inclined edge 67b of the fast rewind pushbutton actuator 3 abuts on the projection 72 to turn the pivot lever 71 counterclockwise in this figure whereupon the prong 74 of the pivot lever 71 forces the upstanding rib 73 of the head plate 4 in a direction toward the non-play position.

Figure 12:
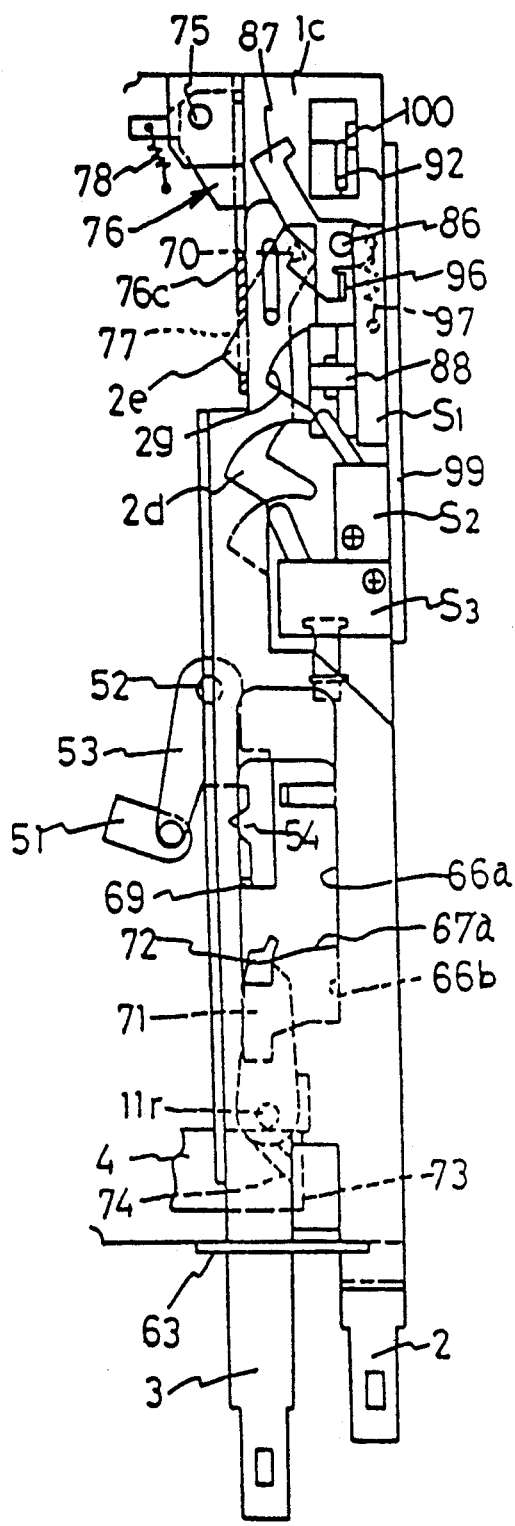
FIGS. 12 and 13 are plan views showing the operational relationship between the fast forward pushbutton actuator, the latch mechanism and the head channel shift mechanism.

As a consequence of this movement of the head plate 4, the inner edges of the respective recesses 16f, 16r engage the corresponding locking lugs 13'f, 13'r of the brackets 13f, 13r to turn the brackets 13f, 13r in a direction to disengage the pinch rollers 12f, 12r from the corresponding capstan shafts 14f, 14r, whereby the load on the magnetic tape is released. Thus the direction of travel of the magnetic tape is reversed. The magnetic tape is fed in the reverse direction. The foregoing description is directed to a tape travel direction changeover operation in which the fast rewind pushbutton actuator 3 is depressed to change the direction of travel of the magnetic tape and retract the head plate 4 toward the non-play direction, thereby feeding the magnetic tape in the reverse direction at fast speed. When the magnetic tape is to be fed in the fast forward direction from the condition shown in FIG. 9, the fast forward pushbutton actuator 2 is depressed against the force of the non-illustrated return spring. The fast forward pushbutton actuator 2, as opposed to the fast rewind pushbutton actuator 3, does not require the tape travel direction changeover operation, and hence has no means equivalent to the actuating lug 69 acting on the triangular projection 54 on the locking member 53 of the tape travel direction changeover mechanism 40. Accordingly, upon manual depression of the fast forward pushbutton actuator 2 against the force of the associated return spring, the inclined edge 67a abuts against the projection 72 to turn the pivot lever 71 in the counterclockwise direction as shown in FIG. 12, in the same manner as done in response to the depression of the fast rewind pushbutton actuator 3. The head plate 4 is displaced in the non-play direction whereupon the magnetic tape is fed forwardly at fast speed.

Figure 10:
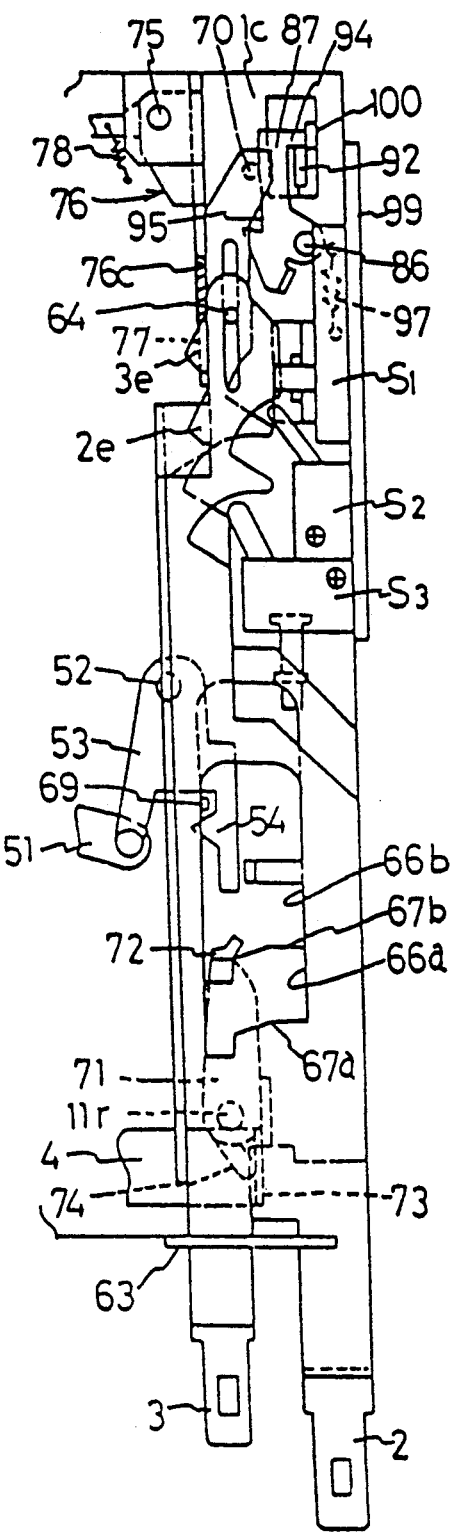

The aforesaid depressed condition of each of the fast forward pushbutton actuator 2 and the fast rewind pushbutton actuator 3 is retained by a latch member 76 horizontally rotatably mounted on a pivot pin 75 located in front of the respective pushbutton actuators 2, 3, as shown in FIGS. 10 and 12. The latch member 76, as shown in FIGS. 1 and 5, is of a generally T-shape having two transverse wings 76a, 76b and a longitudinal wing 76c. The vertical wing 76c has an retaining hole 77 in which the triangular locking projection 2e, 3e on the pushbutton actuators 2, 3 are latched selectively to lock the pushbutton actuators 2, 3 in the depressed or advanced position. The latch member 76 is normally urged by a return spring 78 in the counterclockwise direction to approach the front end portions of the respective pushbutton actuators 2, 3.

The advanced position of the fast forward pushbutton actuator 2 or the fast rewind pushbutton actuator 3 thus latched is released when one pushbutton actuator 2, 3 which is held in the non-activated position is depressed, thereby causing the longitudinal wing 76c to be tilted by the locking projection 2e or 3e against the force of the return spring 78.

A head channel selector mechanism 80 will be described below.

Figure 14:
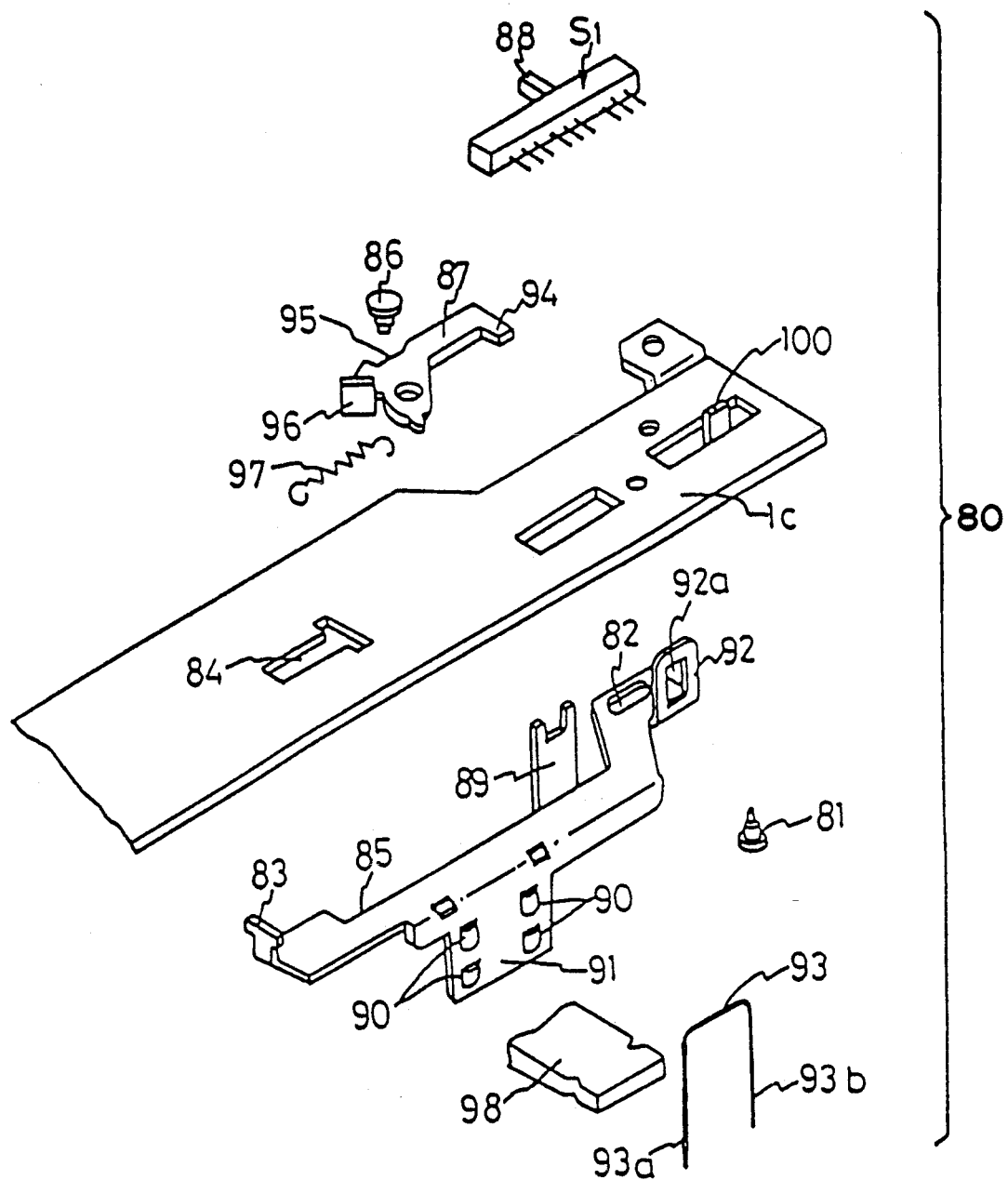
FIG. 14 is an exploded perspective view of the head channel shift mechanism.

This mechanism 80, as shown in FIG. 14, includes an elongate actuating member 85 slidably disposed on the undersurface of the auxiliary base plate 1c slidably supporting thereon the fast forward and rewind pushbutton actuators 2, 3, and a blocking lever 87 pivoted on a shaft 86 secured to the upper surface of a front end portion of the auxiliary base plate 1c. The actuating member 85 is reciprocally movable partly through an engagement between a pin 81 and an oblong hole 82 that are provided at the front end of the actuating member 85, and partly through an engagement between an upwardly bent strip 83 at the rear end of the actuating member 85 and a longitudinally elongated groove 84 in the auxiliary base plate 1c. The actuating member 85 includes an actuating finger 89 projecting upwardly from an intermediate portion thereof and engaging at its upper end an actuator 88 of a microswitch S1 for a magnetic head channel selector circuit, a support leg 91 depending from an outer edge of the actuating member 85 and having two pairs of vertically aligned arcuate retaining projections 90 punched out from the material of the actuating member 85, and a rectangular hollow locking wing 92 upstanding from the front end of the actuating member 85. A resilient member comprises a wire spring 93 bent into an inverted U and having a pair of parallel spaced legs 93a, 93b retained by the retaining projections 90.

The blocking lever 87 has a prong 94 at its front end engageable with the locking wing 92 of the actuating member 85, a recessed step 95 on its underside of an intermediate portion thereof, and an abutment portion 96 at the rear end thereof. The blocking lever 87 is normally urged by a spring 97 in a direction to engage the prong 94 and the locking wing 92.

The pivotable plate 21f stated above is provided with an interlocking strip 98 extending toward the right side edge of the chassis 1. The interlocking strip 98 is held between the opposite legs 93a, 93b of the resilient member 93.

Figure 13:
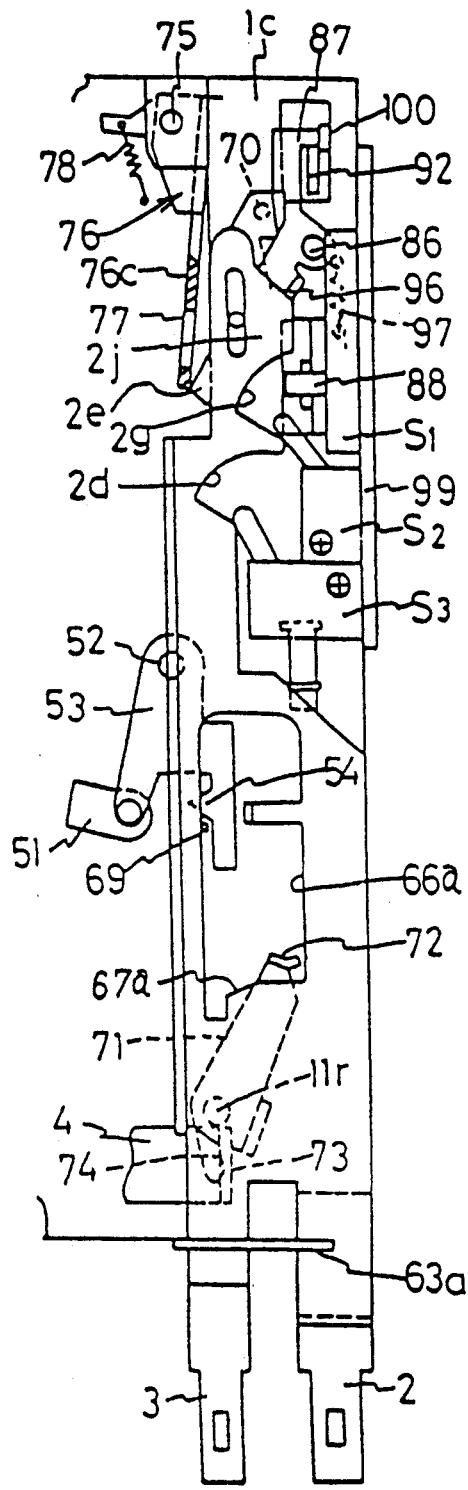

In FIGS. 9 and 13, denoted by S2 is a muting switch activated by the second recesses 2g, 3g of the fast forward and rewind pushbutton actuators 2, 3 when the pushbutton actuator 2 or 3 are depressed separately, and S3 is a motor speed doubling switch activated by the first recesses 2d, 3d of the respective pushbutton actuators 2, 3 when they are depressed. These switch S2, S3 are held in the ON state while the pushbutton actuators 2, 3 are latched in the advanced position. Designated by 99 is a mounting plate secured to the side surface of the chassis for attachment of the switches S1, S2, S3, and 100 is a stopper projecting from the auxiliary base plate 1c for limiting the angular movement of the blocking lever 87.

When the magnetic tape is running in the reverse direction in the play mode as shown in FIGS. 1 and 9, the fast rewind pushbutton actuator 3 is depressed against the force of the associated return spring. With this forward movement of the fast rewind pushbutton actuator 3, the pin 70 on the front end of this actuator 3 separate from the recesses step 95 in the blocking lever 87 whereupon the blocking lever 87 is turned by the force of the spring 97 in the clockwise direction to prevent forward movement of the actuating member 85 by engagement between the prong 94 and the locking wing 92, as shown in FIG. 10. The forward movement of the fast rewind pushbutton actuator 3 continues until the fast rewind pushbutton actuator 3 is latched by the latch member 97.

The forward movement of the fast rewind pushbutton actuator 3 further causes the retracting movement of the head plate 4, thereby initiating the travel of the magnetic tape at fast speed. Simultaneously therewith, the tape travel direction changeover member 20 moves rearward so that the direction of travel of the magnetic tape is changed by the tape travel direction changeover mechanism 40.

In response to the rearward movement of the tape travel direction changeover member 20, the pivotable plate 21f turns counterclockwise in FIG. 5 to thereby displace the interlocking strip 98 forwardly. In this instance, since the forward movement of the actuating member 85 is prevented by the engagement between the prong 94 and the locking wing 92, one leg 93b of the resilient member 93 which is located forwardly of the other is resiliently flexed counterclockwise from a position indicated by the solid lines to a position indicated by the phantom lines in FIG. 15. In other words, when the fast rewind pushbutton actuator 3 is depressed forwardly, the forward movement of the actuating member 85 is blocked by the blocking member 87, while the rotation of the rotatable plate 21f is permitted. Thus the head channel selector switch S1 is inactivated and hence the tape travel direction is changed alone. With the head plate 4 retracted, the running magnetic tape is held in light contact with the same channel of the magnetic head 5 so that a blank interval between the recordings on the magnetic tape is detected in the rewind direction.

Figure 11:
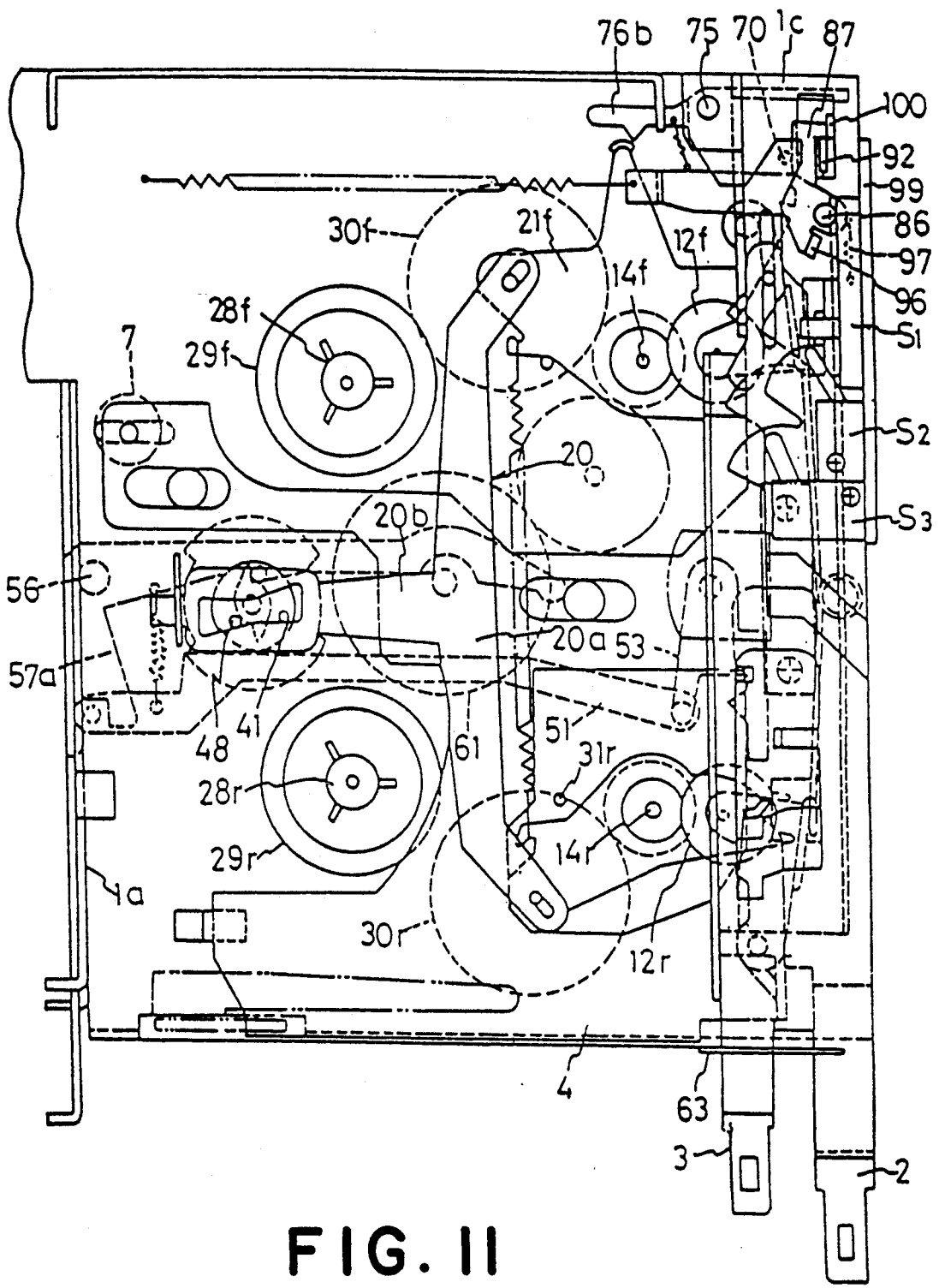
FIG. 11 is a plan view similar to FIG. 1, but showing the condition when the fast rewind pushbutton actuator is operated.

When a blank interval between the recordings on the magnetic tape is detected, a silence detecting means 108 (FIG. 1) produces a detection signal to activate a solenoid R which inturn forces the latch member 76 to turn clockwise in FIGS. 10 and 11 against the force of the return spring 78. The fast rewind pushbutton actuator 3 is released from its advanced position and returns to the initial position.

Retracting movement of the fast rewind pushbutton actuator 3 causes the pin 70 to engage the recesses step 95 of the blocking lever 87 and turn the blocking lever 87 counterclockwise in FIG. 9 against the force of the return spring 97. The actuating member 85 is thus released from the blocking lever 87 and is now permitted to move forwardly. The actuating member is displaced rightward as the leg 93b of the resilient member 93 returns from the phantomlined flexed position shown in FIG. 5 to the solid-lined initial position shown in FIG. 16. With this rightward movement of the actuating member 85, the head channel selector switch S1 is activated to shift the magnetic head channel. However, also in the course of the return stroke of the fast rewind pushbutton actuator 3, the tape travel direction is changed over. Accordingly, owing to the operation of the tape travel direction changeover mechanism 40, the pivotable plate 21f turns clockwise to return from the position of FIG. 5 to the position shown in FIG. 1. The opposite legs 93a, 93b of the resilient member 93 while holding therebetween the interlocking strip 98 is displaced leftward in FIG. 5 so that the actuating member 85 and the switch S1 return to the position to restore the initial channel condition indicated by the solid lines in FIG. 15.

Figure 15:
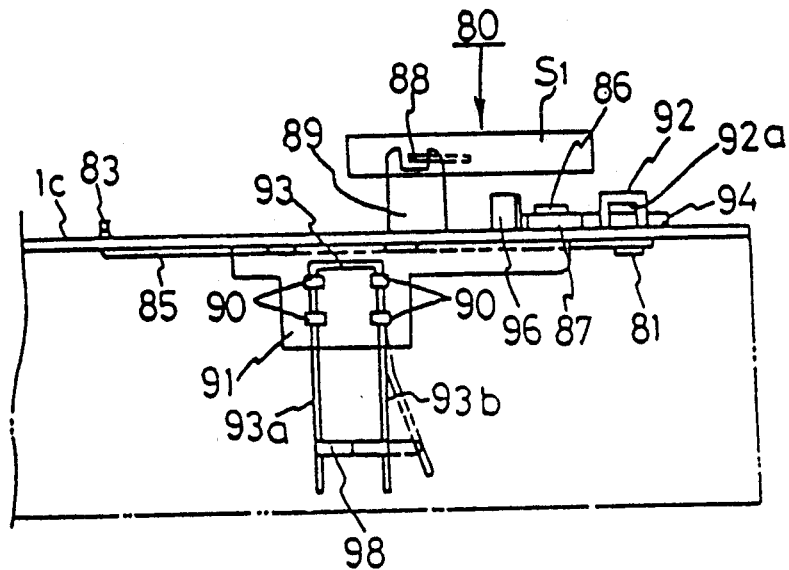
FIGS. 15 and 16 are side elevational views illustrative of the operation of the head channel shift mechanism.
Figure 16:
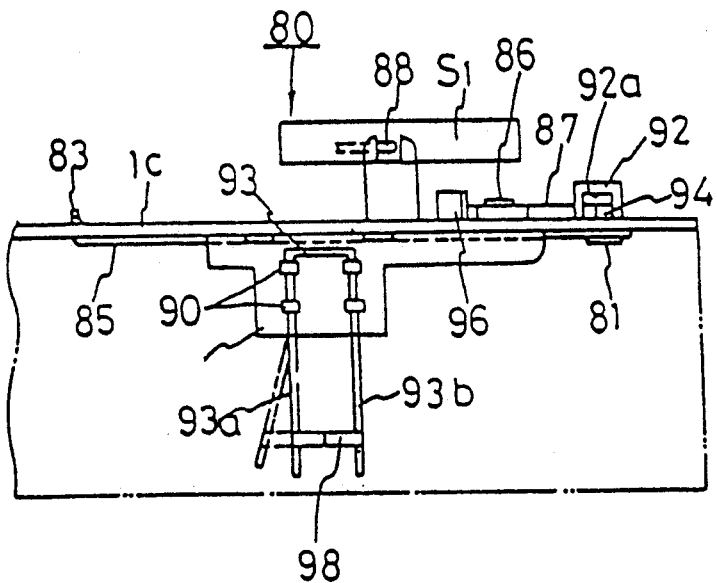

Since the transition from the condition indicated by the phantom lines in FIG. 15 to the condition indicated by the solid lines in FIG. 16, and the transition from the condition indicated by the solid lines in FIG. 16 to the condition indicated by the solid lines in FIG. 15 occur substantially concurrently, the head channel selector switch S1 is kept in the inactivated condition.

While the magnetic tape is running in the forward direction in the play mode shown in FIG. 5, the fast rewind pushbutton actuator 3 is depressed forwardly against the force of the associated return spring. With this forward movement of the pushbutton actuator 3, the pin 70 on the front end of this actuator 3 is disengaged from the recessed step 95 of the blocking lever 87, thereby allowing the blocking lever 87 to turn clockwise in FIG. 9 under the force of the spring 97 in the manner described above. In this instance, however, owing to the counterclockwise rotation of the pivotable plate 21f, the interlocking strip 98 and the actuating member 85 are displaced forwardly. Thus, the clockwise rotation of the blocking lever 87 causes the prong 94 to engage in a hole 92a in the locking wing 92, thereby blocking rearward movement of the actuating member 85. The fast rewind pushbutton actuator 3 is retained in its advanced position by the latch member 76, and while keeping this condition, the head plate 4 is retracted to feed the magnetic tape at fast speed. At the same time, the tape travel direction is changed over, and the tape travel direction changeover member 20 is displaced forwardly. With this forward displacement, the pivotable plate 21f turns clockwise so that the interlocking strip 98 formed integrally with the pivotable plate 21f is displaced rearwardly. In this instance, however, since the rearward movement of the actuating member 85 is blocked, the other leg 93a of the resilient member 93 is resiliently flexed clockwise in FIG. 16 by the interlocking strip 98, as indicated by the phantom lines of the same figure. In other words, when the fast rewind pushbutton actuator 3 is depressed forwardly, the rearward movement of the actuating member 85 is prevented by the blocking lever 87, while the rotation of the pivotable plate 21f is permitted. Thus, the head channel selector switch S1 is deactivated and the tape travel direction is changed over. While keeping this condition, a blank interval between the recordings on the magnetic tape is detected by the silence detecting means 108 shown in FIG. 1.

The silence detecting means 108, upon detection of a blank interval, produces a silence detection signal to activate the solenoid R whereupon the latch member 76 is turned against the force of the associated return spring 78, thereby allowing the fast rewind pushbutton actuator 3 to automatically return from the advanced position to the initial position.

With this return of the fast rewind pushbutton actuator 3, the pin 70 on the front end of this actuator 3 engages the recessed step 95 of the blocking lever 87 to turn the blocking lever 87 counterclockwise against the force of the associated spring 97 as shown in FIG. 9, thereby releasing the actuating member 85. The actuating member 85 is displaced rearward in FIG. 16 as the tilted leg 93a of the resilient member 93 indicated by the phantom lines restores its initial posture indicated by the solid lines in FIG. 15. Thus the head channel selector switch S1 is activated to shift the magnetic head channel. However, since the tape travel direction shifts during the return stroke of the fast rewind pushbutton actuator 3, the tape travel direction changeover mechanism 40 operates to turn the pivotable plate 21f counterclockwise, thereby causing the opposite legs 93a, 93b to displace rightward with the interlocking strip 98 held between the legs 93a, 93b. Accordingly, the actuating member 85 and the switch S1 return to the position indicated by the solid lines in FIG. 16 to restore the initial head channel condition.

Since the transition from the condition indicated by the phantom lines in FIG. 16 to the condition indicated by the solid lines in FIG. 15, and the transition from the condition indicated by the solid lines in FIG. 15 to the condition indicated by the solid lines in FIG. 16 occur substantially concurrently, the head channel selector switch S1 is kept in the inactivated condition.

Figure 17:
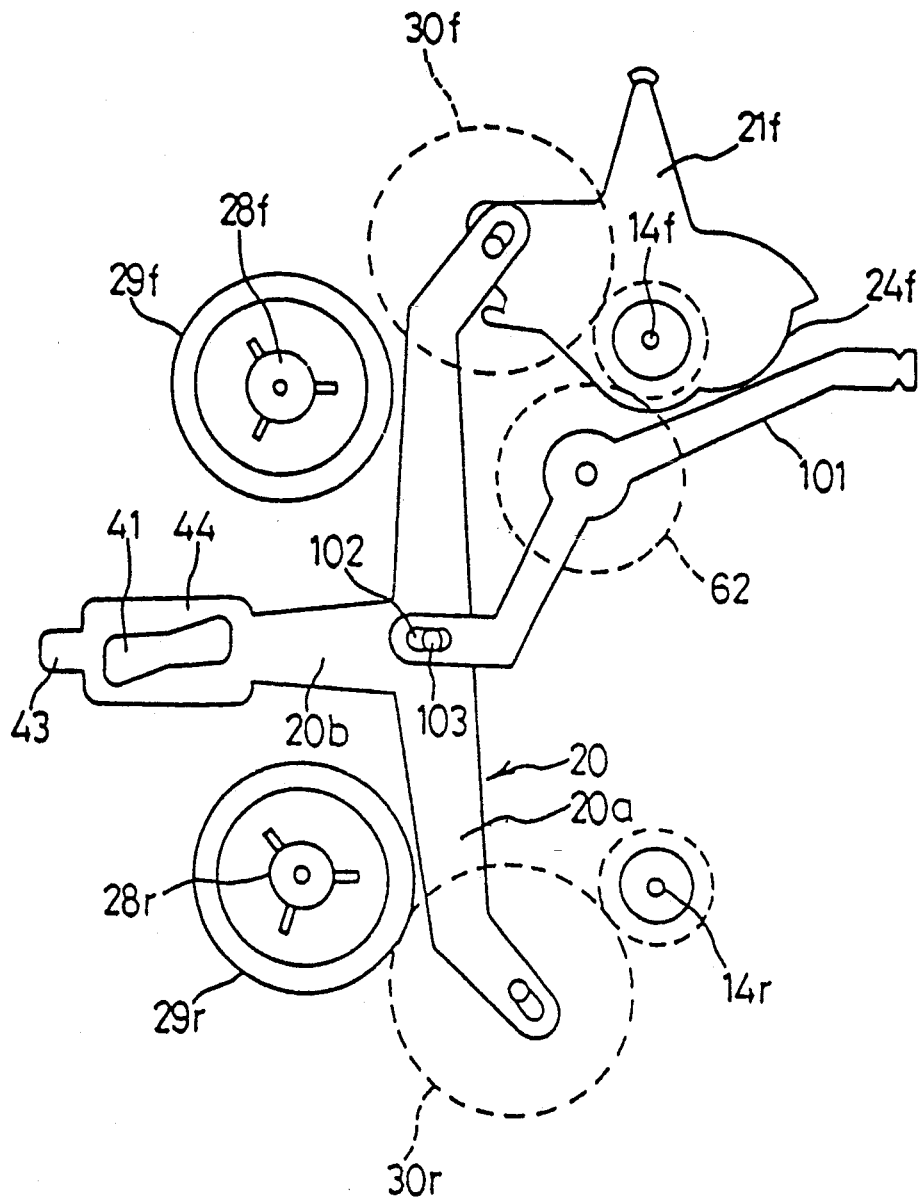
FIGS. 17 through 19 are plan views each showing a modified form of the tape travel direction changeover mechanism including an arm connected to an actuating member.

In the embodiment described above, the actuating strip 98 is integrally formed with the pivotable plate 21f connected to an end of the tape travel direction changeover member 20 and is coupled with the actuating member 85 via the resilient member 93. According to another embodiment shown in FIG. 17, a pivotable lever 101 rotatably mounted on the chassis 1 or on the shaft of the intermediate gear 62 has one end relatively movably connected to the central portion of the elongate head 20a of the T-shaped tape travel direction changeover member 20 via an engagement between an oblong hole 102 formed at one end of the lever 101 and a pin 103 projecting from the tape travel direction changeover member 20. The opposite end of the lever 101 is held between the opposite legs 93a, 93b of the resilient member 93 attached to the actuating member 85. With this construction, the movement of the pivotable lever 101 is responsive to the pivotal movement of the tape travel direction changeover member 20 in the same manner as the pivotable plate 21f so that the operation of the head channel selector mechanism 80 takes place in the same manner as done with the interlocking strip 98 integrally formed with the pivotable plate 21f.

Figure 18:
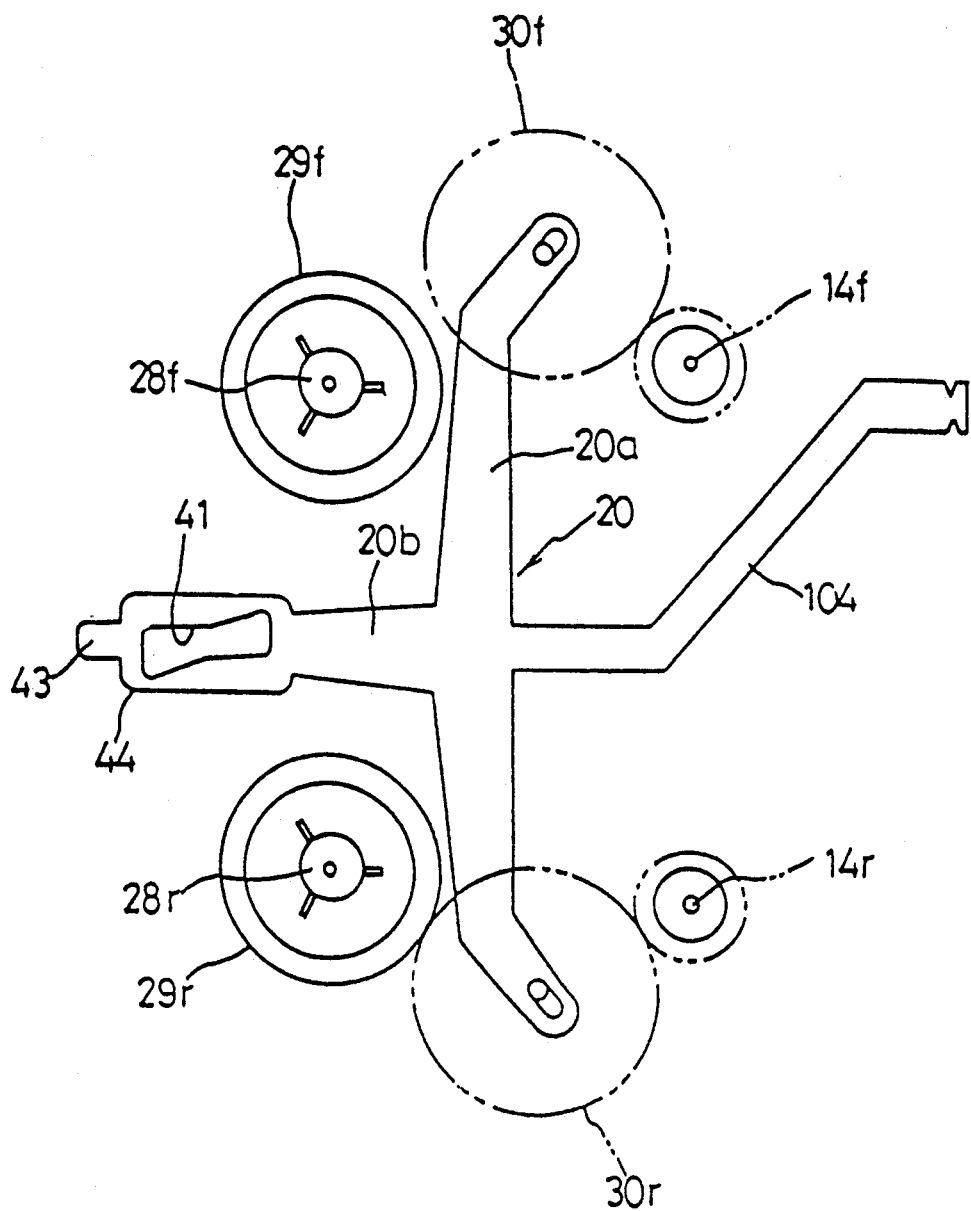

FIG. 18 shows another embodiment in which the tape travel direction changeover member 20 has an integral elongate arm 104 extending from an intermediate portion thereof in a direction opposite to the leg 20b. With this construction, the pivotal movement of the tape travel direction changeover member 20 causes the arm 104 to move in a manner opposite to the locking strip 98 which is provided on the pivotable plate 21f. For instance, when the reverse play mode shown in FIG. 1 is shifted to the forward play mode shown in FIG. 5, the distal end of the arm 104 moves rearwardly (from the solid-lined position to the phantom-lined position of FIG. 16), as against the forward movement (from the solid-lined position to the phantom-lined position shown in FIG. 15) of the interlocking strip 98 in the first embodiment. Other operational details are the same as that of the first embodiment.

Figure 19:
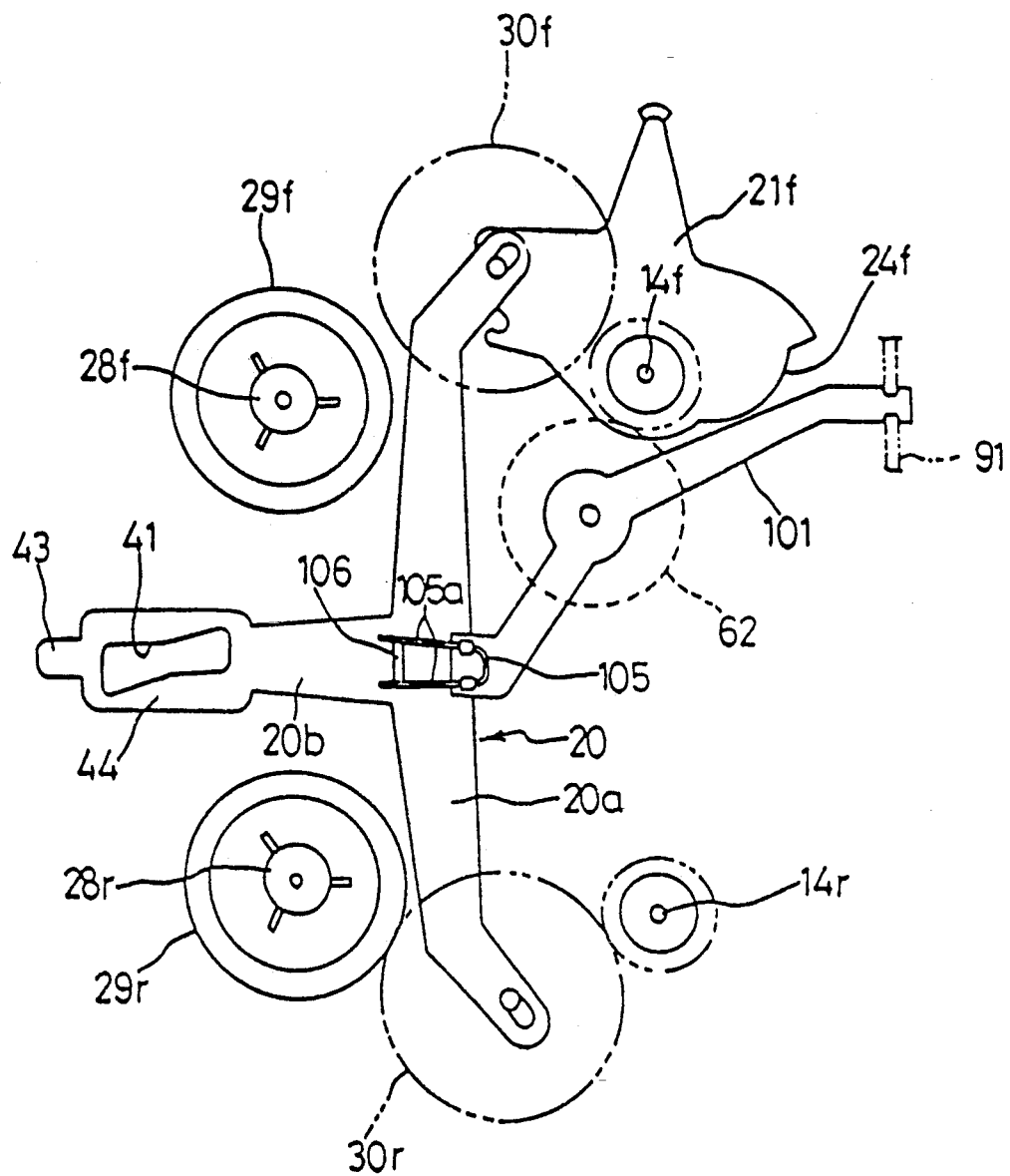
Figure 20:
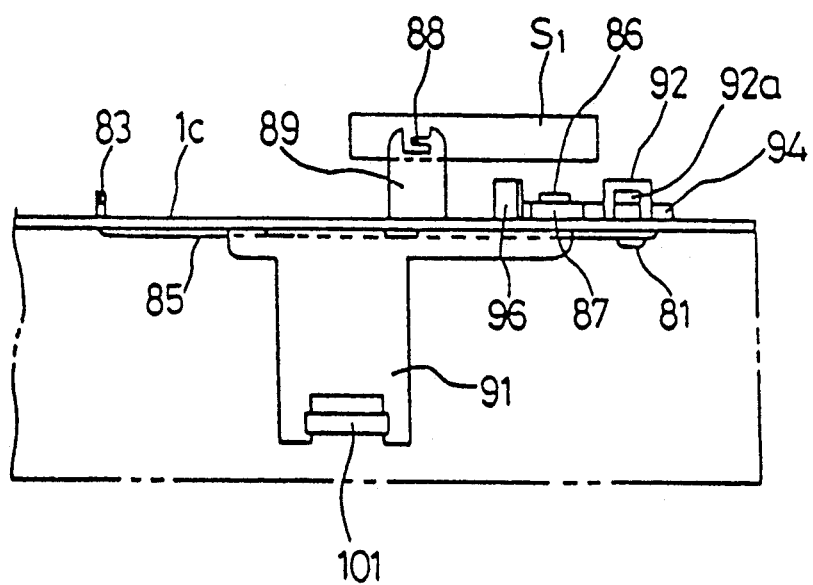
FIG. 20 is a side elevational view showing the connection between the arm and the actuating member.

According to an embodiment shown in FIGS. 19 and 20, a pivotable lever 101 is rotatably mounted on the chassis 1 or on the shaft of the intermediate gear 62, and a U-shaped resilient member 105 is attached at its curved head to one end of the pivotable lever 101. Opposite legs 105a, 105b resiliently hold therebetween a lug 106 projecting from the central portion of the elongate head 20a of the tape travel direction changeover member 20. The opposite end of the pivotable lever 101 is fixed to the lower edge of the support leg 91 of the actuating member 85, as shown in FIG. 20. The lug 106 and the resilient member 105 cooperate together in the same manner as done in the case of the cooperation between the interlocking strip 98 and the resilient member 93.

Figure 21:
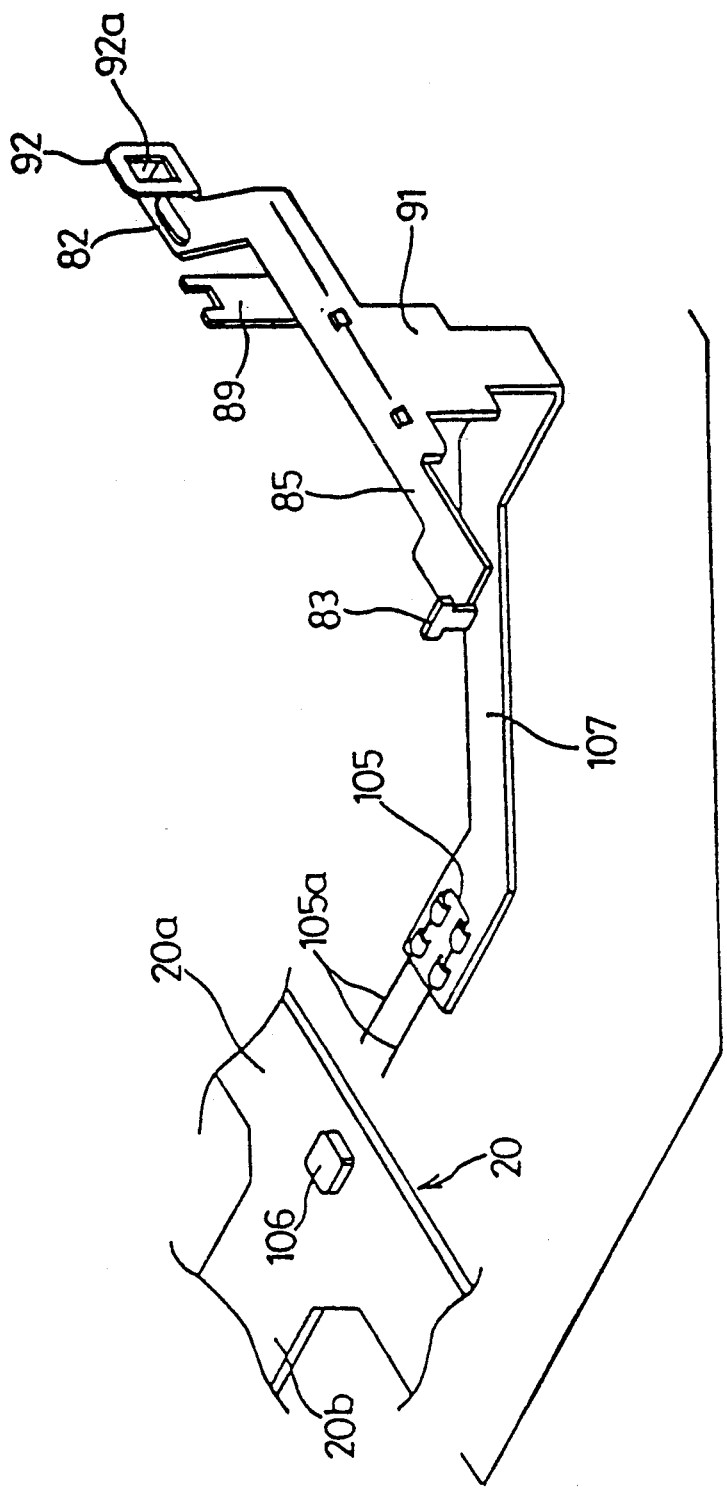
FIG. 21 is a perspective view showing the relation between a tape travel direction changeover mechanism, an arm and an actuating member according to another embodiment.

FIG. 21 shows another embodiment wherein the actuating member 85 has an elongate arm 107 extending integrally and perpendicularly from the lower edge of the support leg 91. The arm 107 supports on its one end a curved head of a U-shaped resilient member 105. Opposite legs 105a of the resilient member 105 resiliently hold therebetween the lug 106 projecting from an intermediate portion of the elongate head 20a of the tape travel direction changeover member 20. The lug 106 and the resilient member 105 cooperate together in the same manner as done with the interaction between the interlocking strip 98 and the resilient member 93 shown in FIGS. 15 and 16.

When the blank interval between the recordings on the magnetic tape is to be detected in the forward direction, the fast forward pushbutton actuator 2 is depressed against the force of the associated return spring.

In this instance, the head plate 4 is moved rearward but the tape travel direction changeover operation and the head channel selector switch S1 activating operation do not take place.

When the tape travel direction is to be changed while the tape player is operating in the play mode, a non-illustrated pushbutton actuator is manipulated to activate the tape travel direction changeover mechanism 40. Then the movement of the actuating member 85 is not prevented and the head channel selector switch S1 is changed in response to the displacement of the interlocking strip 101 provided on the tape travel direction changeover member 20.

Although the actuating member 85 is used in any of the preceding embodiments, it is possible to omit this actuating member 85 in which instance the interlocking strip 98 is operatively connected with the actuator 88 of the head channel selector switch S1 via the resilient member 93, and the blocking lever 87 blocks the movement of the resilient member 93 or the actuator 88 to keep the head channel selector switch S1 in inactivated condition.

If the fast forward pushbutton actuator 2 and the fast rewind pushbutton actuator 3 could be depressed concurrently and they were held in the advanced position by the latch member 76, it would be no longer possible to release one pushbutton actuator 2 or 3 from its advanced position when the other is depressed forwardly toward its advanced position as in the manner described above.

The tape player of the present invention is free from the foregoing deficiency because of the provision of the blocking lever 87 having the abutment portion 96.

When the fast forward pushbutton actuator 2 and the fast rewind pushbutton actuator 3 are depressed concurrently, the pin 70 on the front end of the fast rewind pushbutton actuator 3 is disengaged from the recessed step 95 of the blocking lever 87 irrespective of whether either pushbutton actuator advances to another. Consequently, the blocking lever 87 is instantaneously turned clockwise in FIG. 13 by the force of the spring 97 and hence the elongate protuberance 2j of the fast forward pushbutton actuator 3 abuts against the abutment portion 96 of the blocking lever 87. The forward movement of the fast pushbutton actuator 2 is thus prevented, while the fast rewind pushbutton actuator 3 is allowed to move forwardly. The fast rewind pushbutton actuator 3 is retained in its advanced position by the latch member 76 until released upon forward movement of the fast forward pushbutton actuator 2. The present invention thus obviates the occurrence of a concurrent latching of the fast forward and rewind pushbutton actuators 2, 3 in the advanced position.

As described above, the tape player of the present invention is so constructed to prevent the actuation of the head channel selector switch during the forward stroke of the fast rewind pushbutton actuator. The backward movement of the head plate and the tape travel direction changeover operation are performed after the magnetic head channel is shifted. Accordingly, the tape player of the present invention is stable in operation, as opposed to the conventional tape player wherein due to the timing error, the head plate retracting movement and the head channel selecting operation are likely to take place after the tape travel direction is changed over, or alternately the tape travel direction may be changed over after the backward movement of the head plate. Furthermore, a concurrent latching of the fast forward and rewind pushbutton actuators in the advanced position can be prevented by the abutment portion. A mechanism needed for such concurrent latching prevention is simple in construction because the abutment portion is a part of the blocking means for blocking the actuation of the head channel selector switch.

Obviously various minor changes and modifications of the present invention are possible in the light of the above teaching. It is therefore to be understood that within the scope of the appended claims the invention may be practiced otherwise than as specifically described.

What is claimed is:

1. A tape player in combination with silence detecting means comprising:
   a reciprocably movable rewind pushbutton actuator;
   a changeover mechanism for shifting a tape travel direction changeover member in response to the reciprocating movement of said rewind pushbutton actuator;
   a head channel selector switch connected to said changeover mechanism via resilient connecting means and shiftable in response to the shifting operation of said changeover mechanism;
   said silence detecting means being operable to detect a blank interval between recordings on a magnetic tape and producing a silence interval detection signal upon detection of the blank interval;
   a latch mechanism for releasably holding said rewind pushbutton actuator in its advanced position, said latch mechanism being responsive to said silence interval detection signal for releasing said rewind pushbutton actuator;
   blocking means for blocking the shifting operation of said head channel selector switch during the forward movement of said rewind pushbutton actuator; and wherein said resilient connecting means includes an actuating member movable to shift said head channel selector switch and operatively connected with said blocking means so that the movement of said actuating member in a direction to shift said head channel selector switch may be blocked by said blocking means member, a pivotable member rotatably movable about its central portion and having one end connected to one of said actuating member and said tape travel direction changeover member, and a resilient member resiliently connecting the opposite end of said pivotable member and the other of said actuating member and said tape travel direction changeover member while allowing relative movement therebetween.

2. A tape player according to claim 1, wherein said tape travel direction changeover member comprises a substantially T-shaped plate including an elongate head and a leg extending perpendicularly from a central portion of said elongate head and operatively connected with said changeover means, said pivotable member comprising a pivotable plate rotatably mounted on a capstan shaft, said pivotable plate having one end relatively movably connected to said elongate head of said T-shaped tape travel direction changeover member and the opposite end connected to said actuating member by said resilient member.

3. A tape player according to claim 2, wherein said elongate head of said tape travel direction changeover member has an oblong hole, said pivotable plate having a pin projecting from said one end of said pivotable plate and loosely received in said oblong hole, said pivotable plate further having an interlocking strip extending from said opposite end thereof, said resilient member comprising a substantially U-shaped wire spring attached to said actuating member and having a pair of spaced legs resiliently holding therebetween said interlocking strip.

4. A tape player according to claim 1, wherein said tap travel direction changeover member comprises a substantially T-shaped plate including an elongate head and a leg extending perpendicularly from a central portion of said elongate head and operatively connected with said changeover means, said pivotable member comprising a lever pivoted at its central portion and having one end relatively movably connected to the central portion of said elongate head of said T-shaped tape travel direction changeover member, the opposite end of said lever being connected to said actuating member by said resilient member.

5. A tape player according to claim 4, wherein said elongate head of said tape travel direction changeover member has a pin projecting from the central portion thereof, said one end of said lever having an oblong hole movably receiving therein said pin, said resilient member comprising a substantially U-shaped wire spring attached to said actuating member and having a pair of spaced legs resiliently holding therebetween said opposite end of said lever.

6. A tape player according to claim 1, wherein said tape travel direction changeover member comprises a substantially T-shaped plate including an elongate head and a leg extending perpendicularly from a central portion of said elongate head and operatively connected with said changeover means, said pivotable member comprising a lever pivoted at its central portion and having one end connected by said resilient means to the central portion of said T-shaped tape travel direction changeover member, the opposite end of said lever being firmly attached to said actuating member.

7. A tape player according to claim 6, wherein said elongate head of said tape travel direction changeover member has a lug at its central portion, said resilient member comprising a substantially U-shaped wire spring attached to said one end of said lever and having a pair of spaced legs resiliently holding therebetween said lug.

8. A tape player according to claim 1, wherein said tape travel direction changeover member comprises a substantially T-shaped plate including an elongate head and a leg extending perpendicularly from a central portion of said elongate head and operatively connected with said changeover means, said one end of said elongate arm being integral with said central portion of said elongate head, said resilient member comprising a substantially U-shaped wire spring attached to said actuating member and having a pair of spaced legs resiliently holding therebetween said opposite end of said elongate arm.

9. A tape player according to claim 8, wherein said substantially T-shaped plate of said tape travel direction changeover member includes an elongate head and a leg extending perpendicularly from a central portion of said elongate head and operatively connected with said changeover means, said elongate head having a lug at its central portion, said one end of said elongate arm being integral with said actuating member, said resilient member comprising a substantially U-shaped wire spring attached to said opposite end of said elongate arm and having a pair of spaced legs resiliently holding therebetween said lug.

10. A tape player according to claim 1, further including a reciprocably movable fast forward pushbutton actuator adapted to be held in its advanced position by said latch mechanism, and an abutment member acting between said fast forward pushbutton actuator and said blocking means to block forward movement of said fast forward pushbutton actuator when said fast forward pushbutton actuator and said rewind pushbutton actuator are simultaneously forced forwardly.

11. A tape player in combination with silence detecting means (108) comprising:
a reciprocably movable rewind pushbutton actuator (3);
a changeover mechanism (40) for shifting a tape travel direction changeover member (20) in response to the reciprocating movement of said rewind pushbutton actuator;
a head channel selector switch (SI) connected to said changeover mechanism via resilient connecting means and shiftable in response to the shifting operation of said changeover mechanism;
said silence detecting means (108) being operable to detect a blank interval between recordings on a magnetic tape and producing a silence interval detection signal upon detection of the blank interval;
a latch mechanism (87) for releasably holding said rewind pushbutton actuator in its advanced position, said latch mechanism being responsive to said silence interval detection signal for releasing said rewind pushbutton actuator;
blocking means (76) for blocking the shifting operation of said head channel selector switch during the forward movement of said rewind pushbutton actuator; and
said resilient connecting means including an actuating member movable to shift said head channel selector switch (SI) and operatively connected with said blocking means (87) so that the shifting operation may be blocked by said blocking means member, a pivotable member (21f, 101) rotatably movable about its central portion and having one end connected to one of said actuating member (85) and said tape travel direction changeover member (20), and a resilient member (93, 105) resiliently connecting the other end of said pivotable member (21f) to the other of said actuating member (85) and said tape travel direction changeover member (20) while allowing relative movement therebetween.

* * * * *